United States Patent [19]

Kaya

[11] Patent Number: 5,570,152
[45] Date of Patent: Oct. 29, 1996

[54] PHOTO FILM CASSETTE

[75] Inventor: Akimasa Kaya, Kanagawa, Japan

[73] Assignee: Fuji Photo Film Co., Ltd., Kanagawa, Japan

[21] Appl. No.: 561,940

[22] Filed: Nov. 22, 1995

[30] Foreign Application Priority Data

Dec. 22, 1994 [JP] Japan .................................. 6-321026

[51] Int. Cl.⁶ ................................................ G03B 17/26
[52] U.S. Cl. ............................................................ 396/515
[58] Field of Search ................................. 354/275, 276, 354/277

[56] References Cited

U.S. PATENT DOCUMENTS

| | | | |
|---|---|---|---|
| 4,395,107 | 7/1983 | Luhrig et al. | 354/275 |
| 4,832,275 | 5/1989 | Robertson | 242/71.1 |
| 4,834,306 | 5/1989 | Robertson et al. | 242/71.1 |
| 5,032,861 | 7/1991 | Pagano | 354/275 |
| 5,083,155 | 1/1992 | Kataoka et al. | 355/75 |
| 5,213,277 | 5/1993 | Takahashi et al. | 242/71.1 |
| 5,296,887 | 3/1994 | Zander | 354/275 |
| 5,517,268 | 5/1996 | Stephany | 354/275 |

FOREIGN PATENT DOCUMENTS

| | | | |
|---|---|---|---|
| 654049 | 4/1965 | Belgium . | |
| 4329486 | 3/1994 | Germany | G03B 17/26 |
| 62-284355 | 12/1987 | Japan | G03C 3/00 |
| 62-286043 | 12/1987 | Japan | G03C 3/00 |

Primary Examiner—Michael L. Gellner
Assistant Examiner—Michael Dalakis
Attorney, Agent, or Firm—Sughrue, Mion, Zinn, Macpeak & Seas

[57] ABSTRACT

A photo film cassette has a spool (15). With photo film (14) wound, the spool is contained in a cassette shell (13, 71) in rotatable fashion. Rotation of the spool causes the photo film to advance to an outside of the cassette shell. A tongue (56, 72) is formed by cutting a slit (62) having a shape of a cornered line in a wall of the cassette shell (13, 71). The tongue, when folded, signals a developed status of the photo film. A groove (61a) is formed in the tongue, is extended across the tongue, and renders the tongue flexible. A support (58, 71a) is disposed on an inside of a wall of the cassette shell and across the slit, is contacted on an inside of the tongue, and prevents the tongue from being bent toward an inside of the cassette shell while the tongue is pressed with force below a predetermined range.

20 Claims, 13 Drawing Sheets

F I G. 9
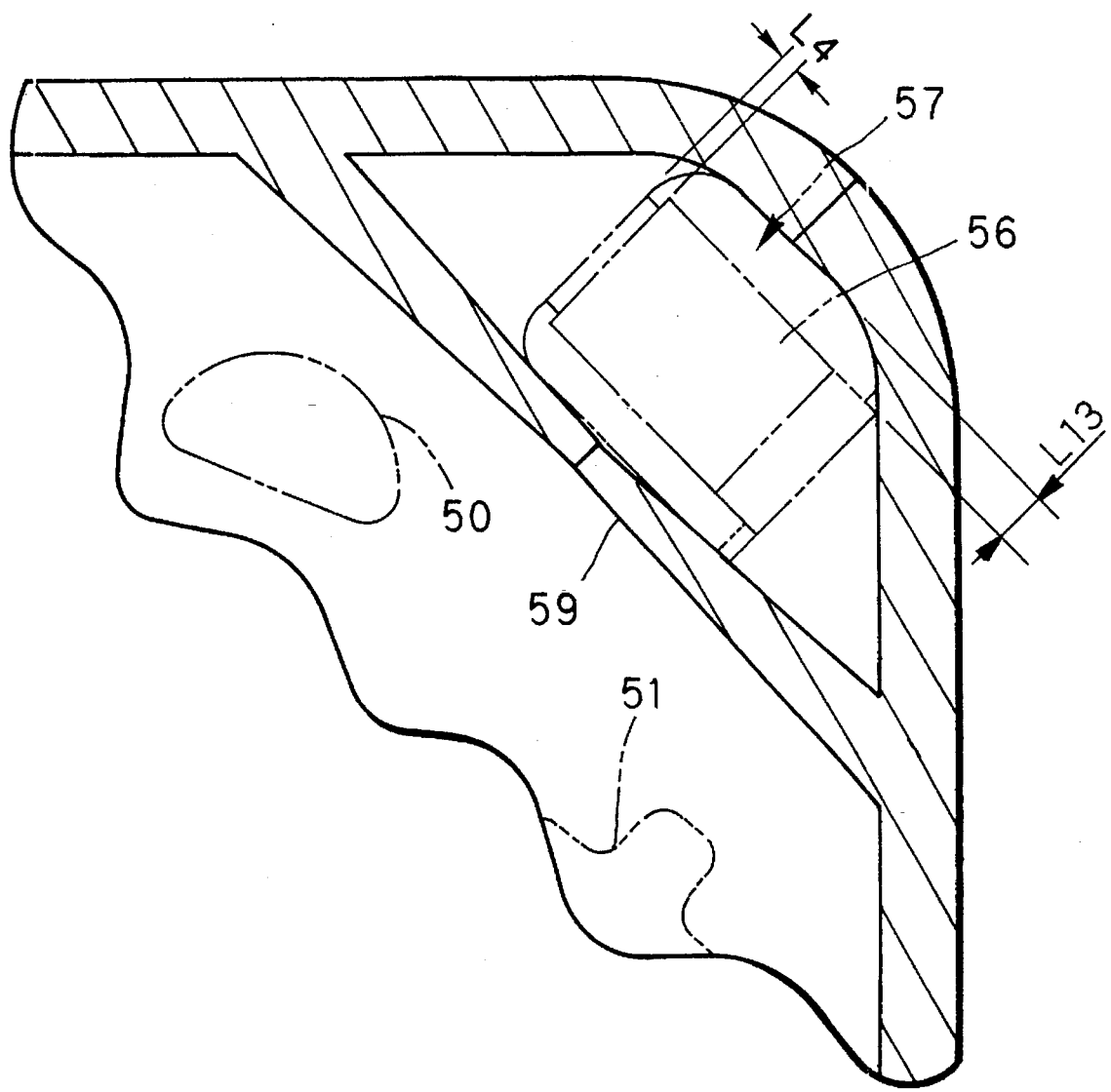

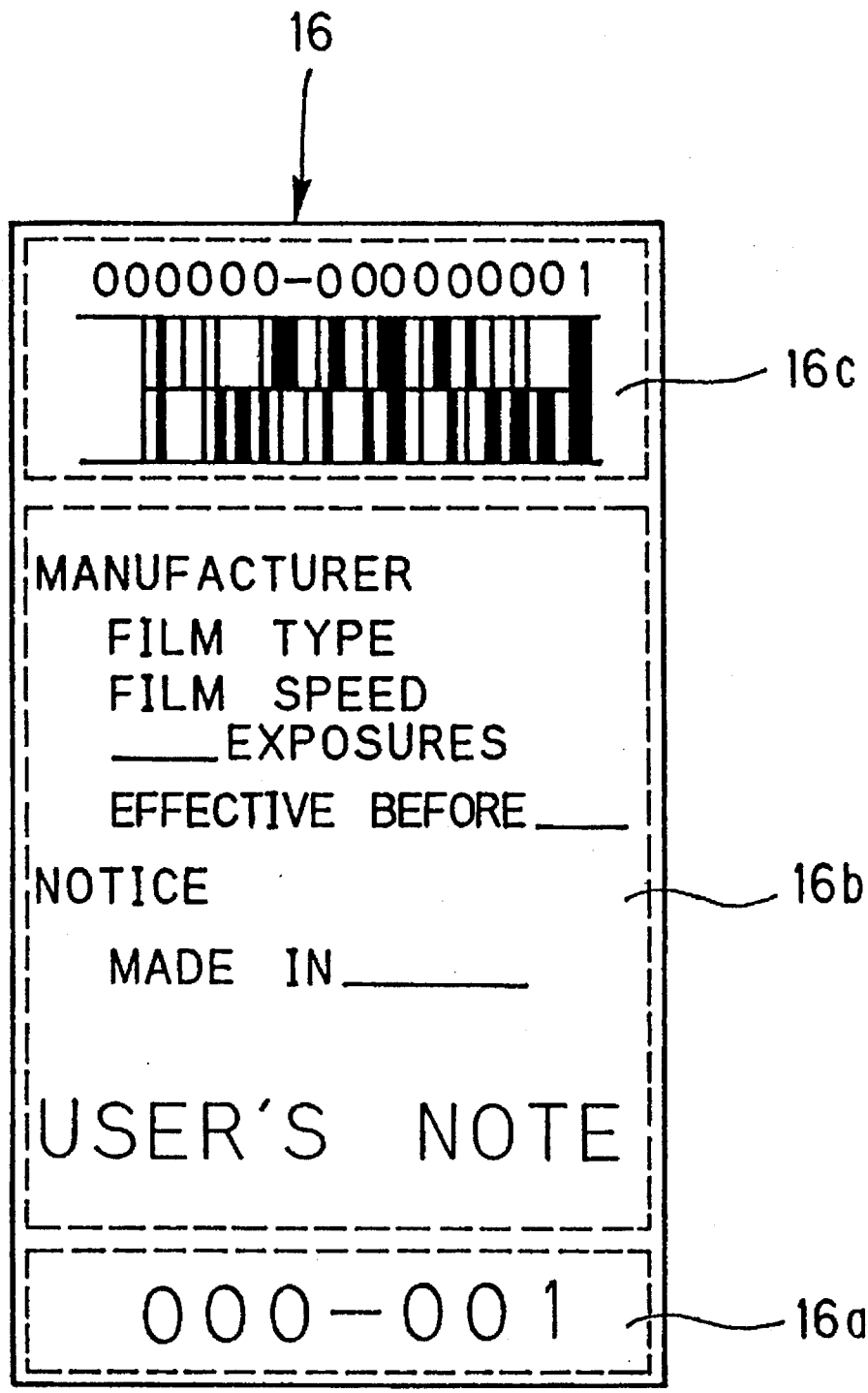

PHOTO FILM CASSETTE

BACKGROUND OF THE INVENTION

1. Field of the Invention

The present invention relates to a photo film cassette of a leader-advancing type. More particularly, the present invention relates to a leader-advancing photo film cassette of which an undeveloped or developed status of photo film can be discerned.

2. Description Related to the Prior Art

A widely used 135-type of photo film cassette contains photo film of which a leader is protruded from a cassette shell in an unexposed status. During insertion of the cassette into a camera, the leader of the photo film as well as the cassette shell require attention for handling. It is difficult remarkably for an unskilled amateur to handle the photo film cassette in loading of the camera. There is a newer type of photo film cassette, of which a leader of unexposed photo film is pre-contained in the cassette shell, and advanced to an outside of the cassette shell when a spool is rotated in an unwinding direction. Such a type of cassette is suggested in U.S. Pat. Nos. 4,832,275 and 4,834,306, and a commonly assigned U.S. Pat. No. 5,213,277 (corresponding to JP-A 3-267932).

Also, there is a cartridge for containing a developed photo film having the same structure as the above type, as disclosed in U.S. Pat. No. 5,083,155 (corresponding to JP-A 3-179341). All the developed photo film can be wound into the cassette shell, and kept without being cut. When required, the spool is rotated to advance a leader of the developed photo film, before a desired frame is pulled out by adjusting a pulled amount of the photo film. The handling and the preservation of the developed photo film is facilitated. It is also easy to automate optical instruments including a photographic printer, a video printer and the like, because operability of those can be simplified.

It is conceivable to use a cassette shell for unexposed photo film also as a cartridge for a developed photo film. However it is impossible visually to discern whether the photo film is developed or undeveloped while the photo film is wound in the cassette shell, because the leader is wholly contained in the cassette shell. Various errors are likely to occur: an unexposed photo film, or an exposed and undeveloped photo film is likely to be unwound out of a cassette; and the photo film after the exposure and the development is likely to be loaded in a camera.

To solve this problem, it is known to form a tongue with a certain position outside a cassette shell. If the tongue is folded and eliminated, this indicates that the development has been effected.

If the user erroneously grasps or pushes the tongue in holding the cassette, it is likely that the tongue is folded and separated easily. It is conceivable to raise the thickness of the tongue to strengthen it. In turn such a thick tongue has a drawback of impossibility in folding. Otherwise the thick tongue may be folded in an unwanted shape, to have a rough shape at its fold.

Recently public concern has been shown on environmental problems. When the tongue is folded and eliminated from the cassette shell, a problem of waste of the tongue piece arises. More seriously, the tongue as separated is likely to drop in a camera, and cause breakdown of the camera.

SUMMARY OF THE INVENTION

In view of the foregoing problems, an object of the present invention is to provide a photo film cassette of which a tongue is protected from erroneous folding.

Another object of the present invention is to provide a photo film cassette of which a tongue, which can be folded, can be remain folded without being cut away.

In order to achieve the above and other objects and advantages of this invention, a photo film cassette includes a tongue portion, which is formed by cutting a slit having a shape of a cornered line and in a wall of the cassette shell. The tongue portion, when folded, signals a developed status of the photo film. A first groove is formed in the tongue portion, and across a proximal end of the tongue portion, and renders the tongue portion bendable. A support portion is disposed on an inside of a wall of the cassette shell, is contacted on an inside of the tongue portion, and prevents the tongue portion from being bent toward an inside of the cassette shell while the tongue portion is pressed with force below a predetermined range.

Therefore, a tongue of a cassette of the present invention is protected from erroneous folding. The tongue, which can be folded, can be remain folded without being cut away.

In a preferred embodiment, a partition portion is disposed in the cassette shell, for dividing an inside of the cassette shell into a status indicating chamber and a signaling chamber. The tongue portion is associated with the signaling chamber. The partition portion prevents the tongue portion from entering the status indicating chamber when the tongue portion is separated from the cassette shell.

BRIEF DESCRIPTION OF THE DRAWINGS

The above objects and advantages of the present invention will become more apparent from the following detailed description when read in connection with the accompanying drawings, in which:

FIG. 9 is an explanatory view in section, illustrating a partition with the tongue;

FIG. 10 is an explanatory view illustrating a cassette sticker of the cassette;

DETAILED DESCRIPTION OF THE PREFERRED EMBODIMENT(S) OF THE PRESENT INVENTION

Figure 1:
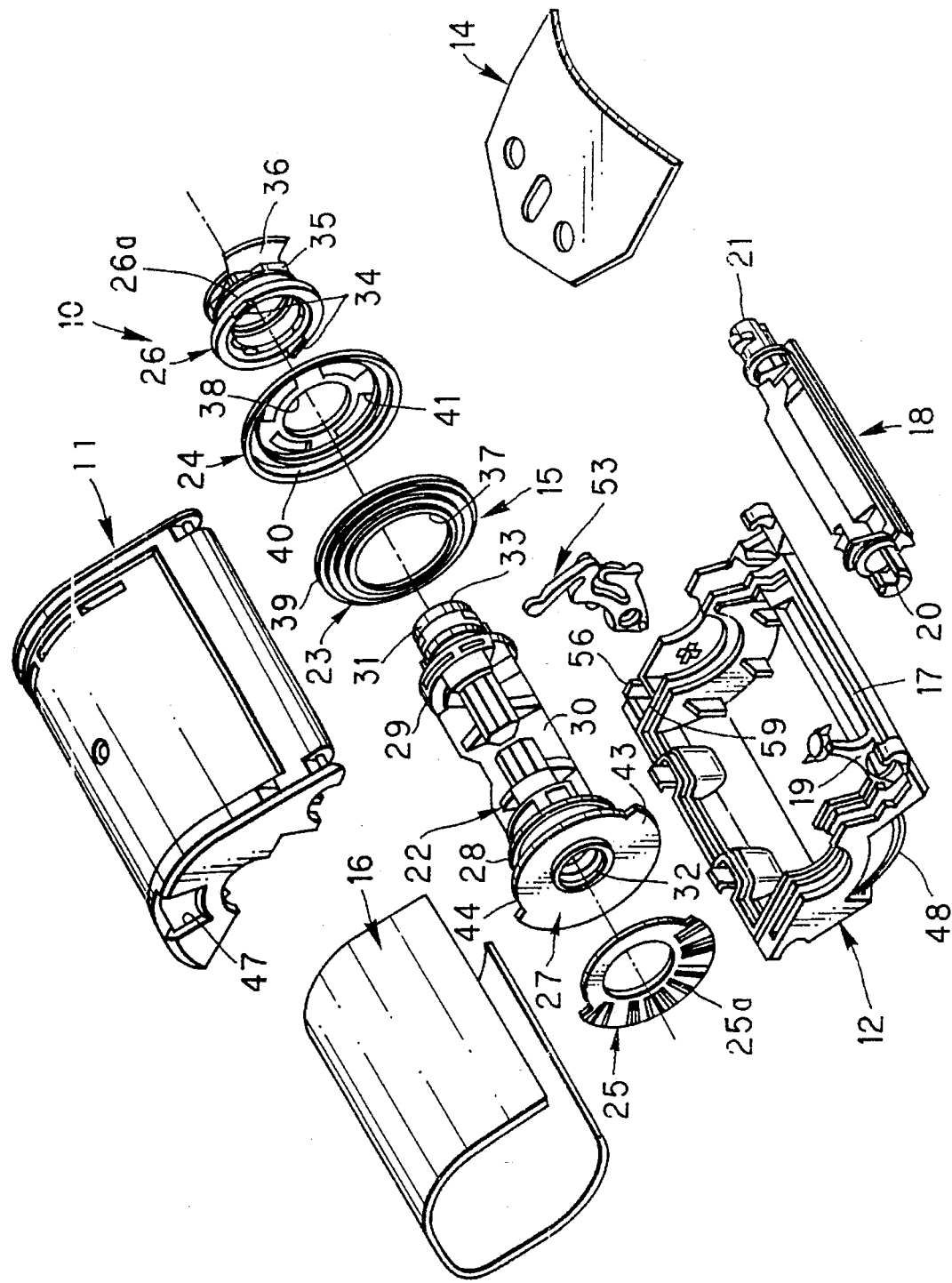
FIG. 1 is an exploded perspective view illustrating a photo film cassette of the present invention.

In FIGS. 1–6, a photo film cassette 10 has a cassette shell 13, in which a spool 15 is contained with photo film 14 wound thereabout. The outside of the cassette shell 13 is provided with a cassette sticker 16. The cassette shell 13 consists of an upper shell half 11 and a lower shell half 12, each of which is formed from resin as a single piece.

Figure 5:
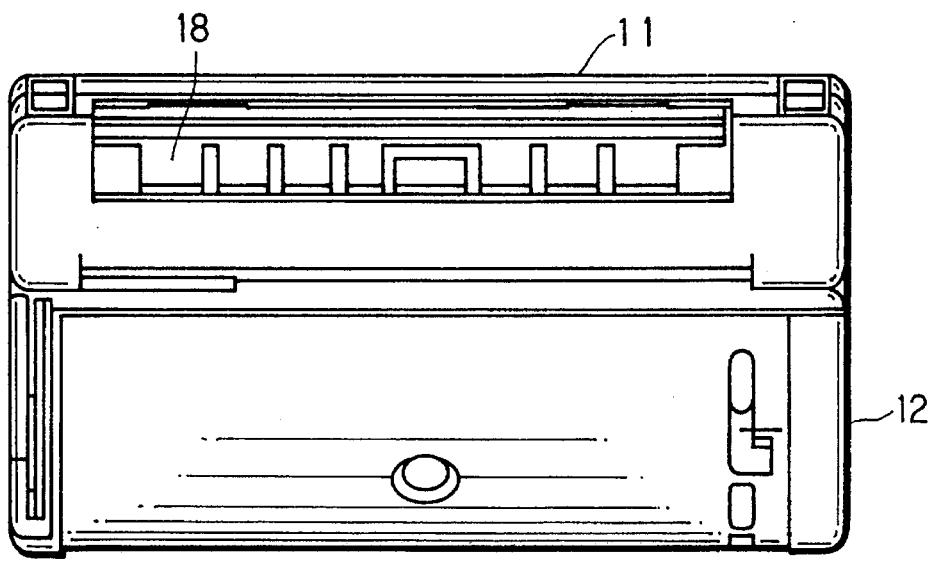
FIG. 5 is a front elevation illustrating the cassette.
Figure 6:
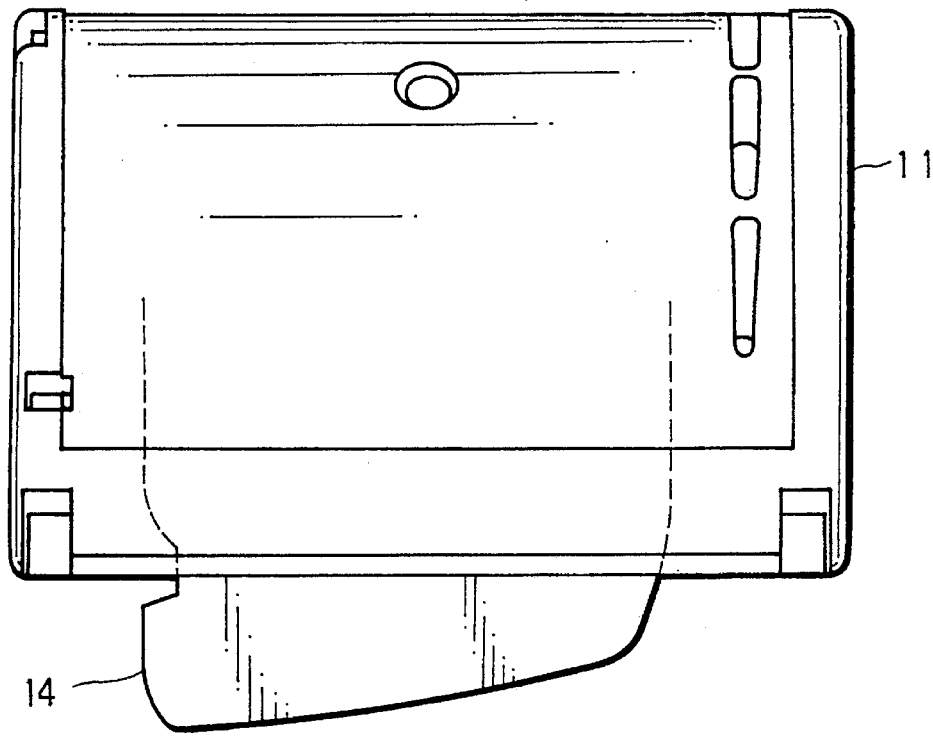
FIG. 6 is a top plan illustrating the cassette.

Part of the juncture between the upper shell half 11 and the lower shell half 12 constitutes a photo film passage port 17 through which the photo film 14 is passed. The photo film passage port 17 has a shutter 18 closed to prevent ambient light from entry, and a separator claw 19 for separating a leader of the film 14. Distal ends of the shutter 18 has keys 20 and 21, which, when the photo film cassette 10 is loaded into a camera, are connected to driving shafts for opening/closing the shutter 18. With the shutter 18 rotated, the shutter 18 is caused to have positions of opening/closing the photo film passage port 17. The state of the closing position is illustrated in FIG. 5.

The spool 15 includes a spool core 22, a pair of flanges 23 and 24, and a barrel member 26 for indication of a status of use, all of which are respective single pieces of resin. The spool core 22 includes a data plate 27, to which a bar code sticker 25 is adhered, two receiving portions 28 and 29 for the flanges 23 and 24, a cutout 30 for retention of the photo film, a receiving portion 31 for the barrel member 26, and the keys 32 and 33, all of which are unified as a single piece. The keys 32 and 33 are connected to a driving shaft of a camera loaded with the photo film cassette 10. The driving shaft rotates to cause the spool core 22 to rotate.

The barrel member 26 includes a disk 26a with ratchet claws 34, a gear 35 and an indicator plate 36, all of which are unified as single piece. The barrel member 26 is fitted on the spool core 22 and rotatable integrally with the spool core 22.

Figure 4:
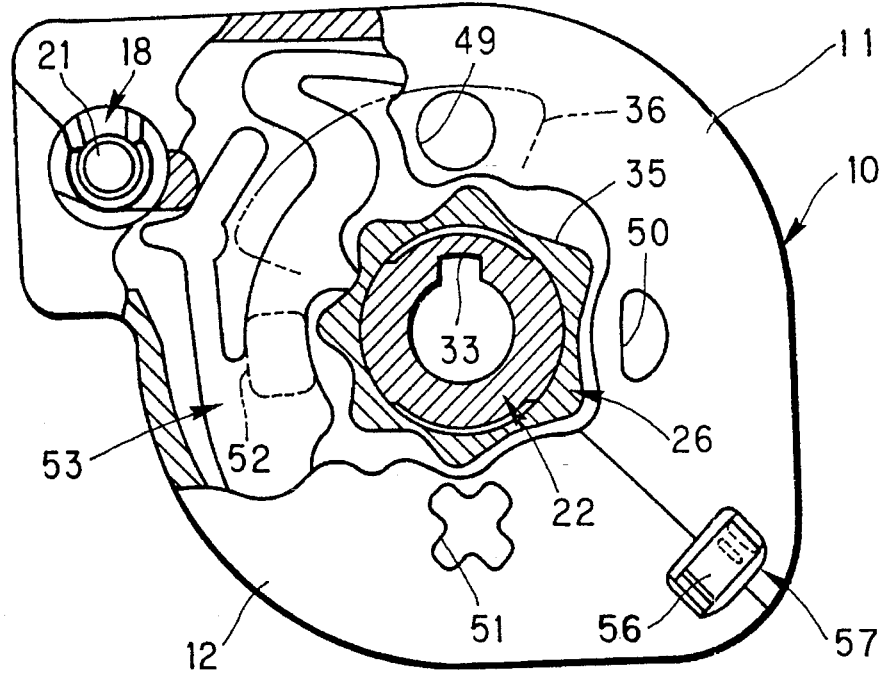
FIG. 4 is an explanatory view in left side elevation, partially cutaway, illustrating the cassette.

The cassette shell 13, as illustrated in FIG. 4, contains a spool lock 53, which comes in mesh with the gear 35. When the shutter 18 has the closed position, the gear 35 is engaged with the shutter 18, to stop the spool 15 from rotating. The photo film 14 is prevented from exiting inadvertently. When the shutter 18 has the open position, the shutter 18 is disengaged from the gear 35.

Figure 2:
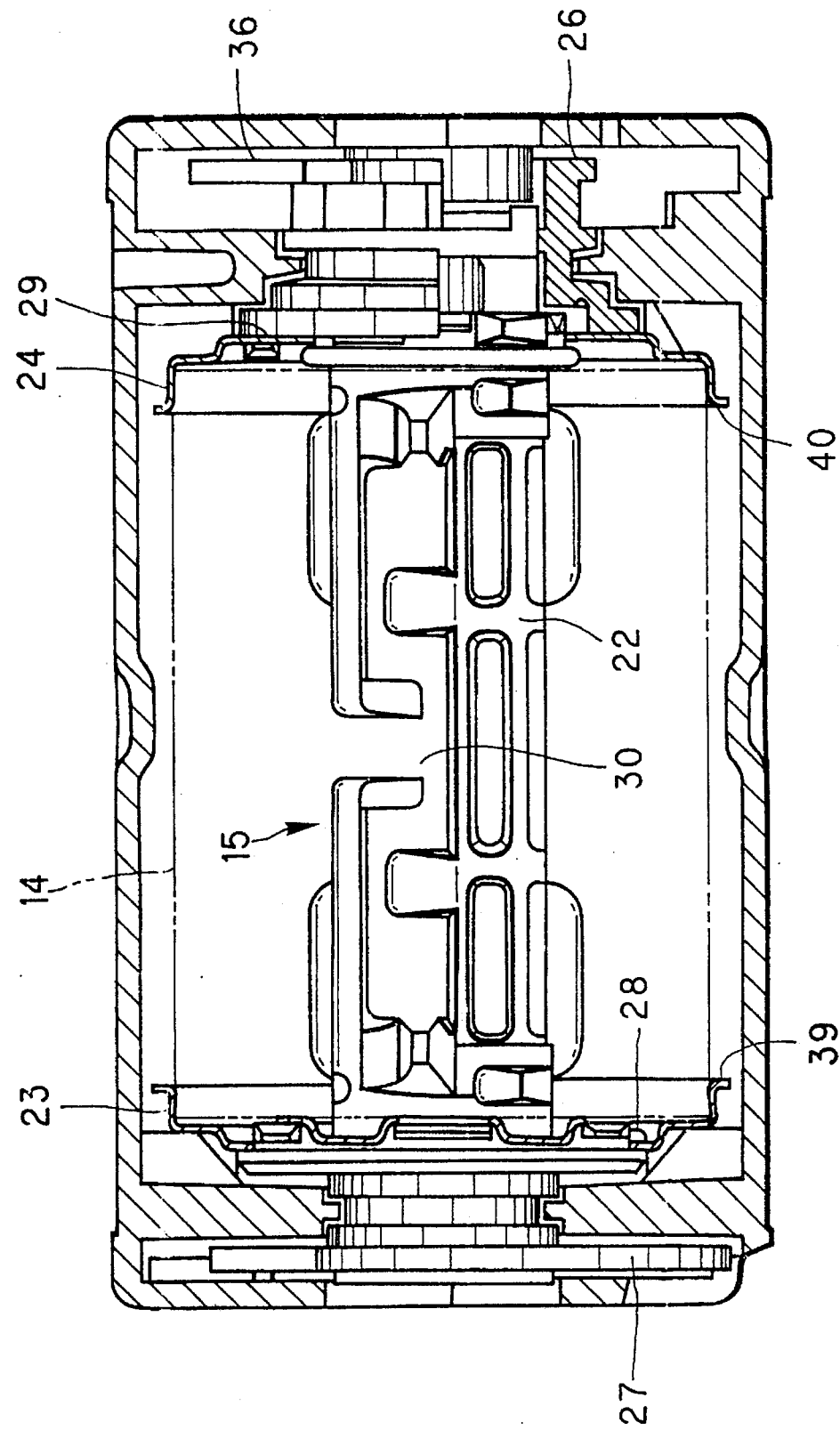
FIG. 2 is a cross section illustrating the cassette of FIG. 1.

The flanges 23 and 24 are formed of plastic material, are shaped like a shallow vessel and have a small thickness. The flange 23 has a greater bearing hole 37, and the flange 24 has a smaller bearing hole 38. The bearing hole 37 is secured to the receiving portion 28 in rotatable fashion. The bearing hole 38 is disposed on the receiving portion 29 in rotatable fashion. The flange 23 has a ring-like lip 39 formed integrally with its periphery. The flange 24 has a ring-like lip 40 projected toward the ring-like lip 39 (FIG. 2). When the spool core 22 is rotated in the unwinding direction, the ring-like lips 39 and 40 cover ends of the outermost turns of the photo film roll, transmit rotation of the spool core 22 to the photo film 14, and keep the photo film 14 from being loosened.

The flange 24 on the other side is provided with four engaging openings 41 in a ring wall of the flange 24 perpendicular to an axis of the spool core 22. The engaging openings 41 are arranged in circular fashion around the bearing hole 38. When the spool core 22 is rotated in the unwinding direction, one of the ratchet claws 34 of the barrel member 26 is engaged with the engaging openings 41. One of the ratchet claws 34 in engagement transmits rotation of the spool core 22 to the flange 24. When the spool core 22 is rotated in the winding direction (reverse to the unwinding direction), the ratchet claws 34 remain unengaged with the engaging openings 41, to keep the flange 24 free from the rotation of the spool core 22.

To advance the photo film 14, the spool 15 is rotated in the unwinding direction. The photo film 14 has the leading end, which is contacted on the separator claw 19 during the rotation of the spool core 22 in the unwinding direction, and directed toward the photo film passage port 17. The leader of the photo film 14 is advanced to the outside of the cassette shell 13 while spreading the ring-like lips 39 and 40 having resiliency (See FIG. 6).

When the photo film 14 is wound in rotation of the spool 15, the flange 24 as well as the flange 23, is stopped from rotating unlike the spool core 22. Though the photo film 14 to be wound is rotated while slipped in contact with the ring-like lips 39 and 40, the ring-like lips 39 and 40 still keep the photo film 14 from being loosened.

The data plate 27 includes a sector portion 43 and a recessed portion 44. The data plate 27 is provided with the bar code sticker 25.

Figure 3:
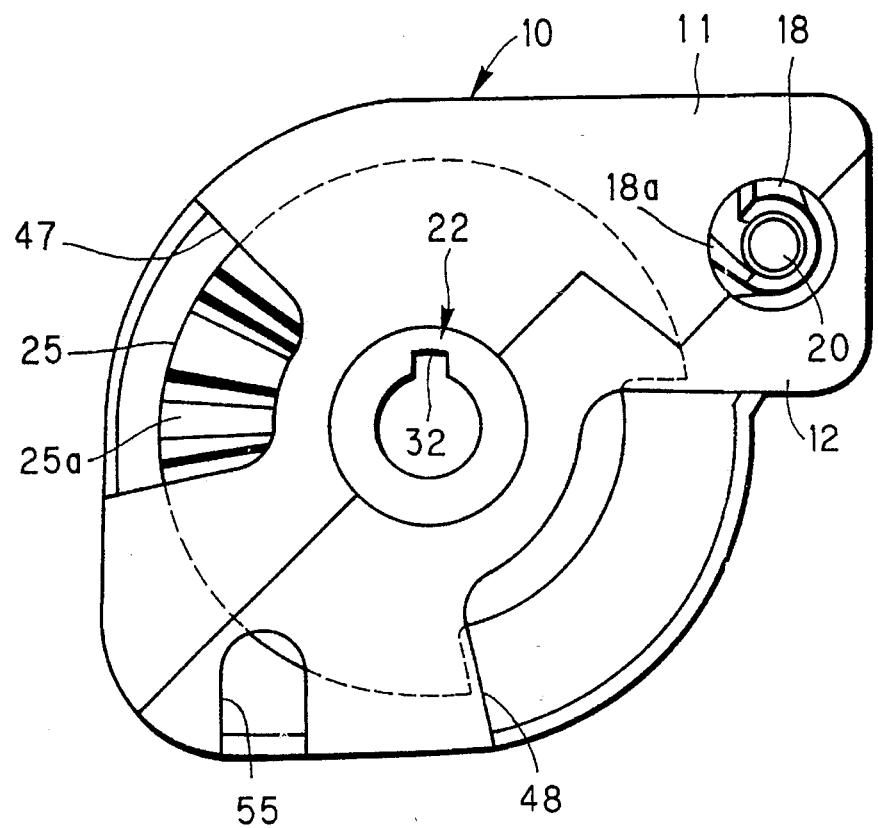
FIG. 3 is an explanatory view in right side elevation, illustrating the cassette.

A bar code 25a is printed on the bar code sticker 25. The bar code 25a represents information inclusive of a type of the photo film, and the like. The bar code 25a is read by a reading sensor in a camera or a photographic printer and while the spool 15 is rotated in an unwinding direction. The bar code 25a is accessed through an access opening 47 formed in the upper shell half 11 as illustrated in FIG. 3. The information as read is used for calculation of exposure amounts, and counting of the number of exposures on the film.

The whole of the photo film 14 is contained in the cassette 10. It is impossible visually to discern whether the photo film 14 in the cassette 10 is exposed or unexposed. For the purpose of preventing the photo film 14 from being reloaded in a camera, there is an access opening 48 formed in the lower shell half 12. The access opening 48 is disposed in a face directed forward in insertion of the cassette 10 in a chamber in a camera. The cassette containing chamber is provided with a lever to be received in the access opening 48.

When the photo film 14 as contained in the cassette 10 is exposed, the spool 15 is controlled by a mechanism of a camera to stop in a stop position where the sector portion 43 appears in the access opening 48. If the photo film 14 as contained in the cassette 10 is unexposed, the spool 15 is stopped in a stop position where the sector portion 43 does not appear in the access opening 48. In the camera, a shifting amount of the lever in the cassette containing chamber is monitored. It is possible to detect the exposed or unexposed status of the photo film 14 as contained in the cassette 10.

There is a notch 55, formed in the lower shell half 12 and in the face the same as the access openings 47 and 48, for detection of sensitivity of the photo film. The notch 55 is adapted to detection of the sensitivity of the photo film 14, by access from a low-cost camera lacking a reader for reading the bar code 25a on the bar code sticker 25. The existence of the notch 55 represents that the photo film 14 has ISO 400 or higher. If the notch 55 does not exist, it means that the photo film 14 has ISO 400 or lower.

Figure 7:
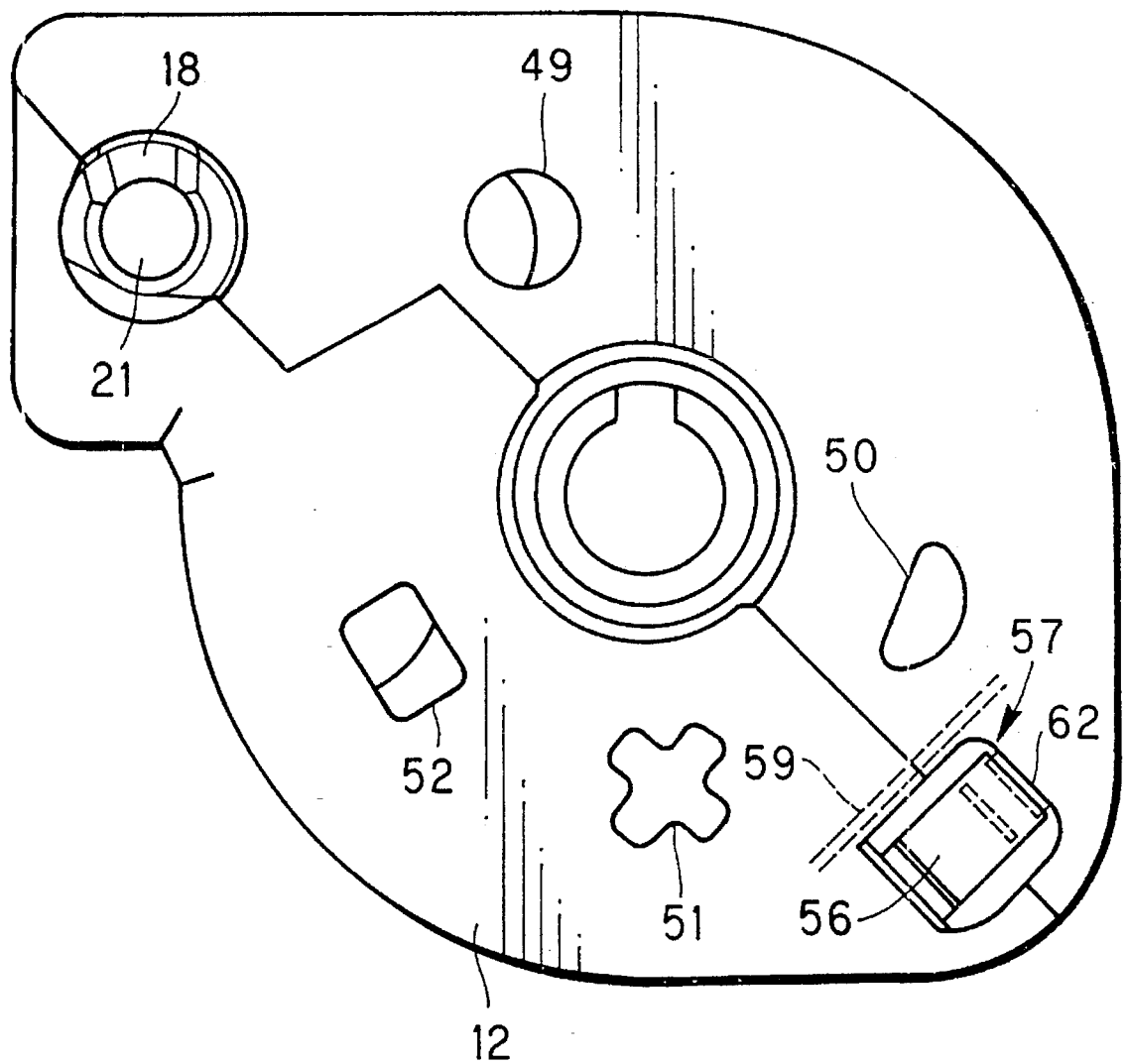
FIG. 7 is a left side elevation illustrating the cassette.

For external recognition of the used status of the photo film 14, the cassette 10, as illustrated in FIG. 7, also has indicator openings 49–52 in a face opposite to the access openings 47 and 48. The first indicator opening 49 indicates the unexposed status of the photo film 14. The second indicator opening 50 indicates the partially exposed status of the photo film 14. The third indicator opening 51 indicates the exposed status of the photo film 14. The fourth indicator opening 52 indicates the developed status of the photo film 14. The stop position of the spool 15 is controlled, to cause the indicator plate 36 to appear in any one of the indicator openings 49–52 to signal the used status of the photo film 14.

Figure 8A:
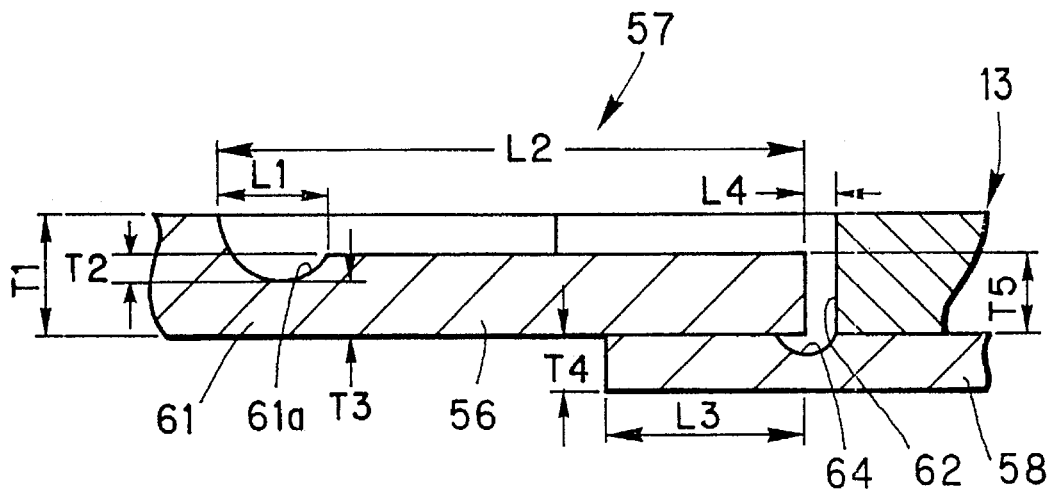
FIG. 8A is a cross section illustrating a tongue for signaling a developed status, before development.

In the face having the indicator openings 49–52, there is disposed a development signaling device 57 adapted to signaling a developed or undeveloped status of the photo film 14 when accessed by a camera or a photo film processor. The development signaling device 57 includes a tongue 56, a support 58 and a partition 59 as illustrated in FIGS. 8A and 9. The tongue 56 is formed integrally with the cassette shell 13. The support 58 lies in the cassette shell 13 and supports the inside of the tongue 56. The partition 59 divides the inside of the cassette shell 13 into a chamber for the status indicator openings 49–52 and a chamber for the development signaling device 57.

At the end of the tongue 56, there is a thinned connector portion 61 defined by forming of a groove 61a with a curved surface. The tongue 56, when the photo film 14 is developed, is folded down toward the inside of the cassette shell 13, to signal the developed status of the photo film 14 in readable fashion without an error. Also at the end of the support 58, a groove 64 is formed.

The partition 59 operates to keep the development signaling device 57 away from the chamber for the spool 15. Should the tongue 56 be cut away from the cassette shell 13, the partition 59 prevents the tongue 56 from entering the region about the spool 15, damaging the photo film 14, and avoids occurrence of an accidental stop of the spool 15.

In FIG. 8A, dimensions are determined: T1=0.75 mm, T2=0.15 mm, T3=0.35 mm, T4=0.25 mm, T5=0.5 mm, L1=0.7 mm, L2=3.1 mm, L3=1.0 mm, and L4=0.2 mm.

A slit 62 of the angular line shape is formed between the tongue 56 and the cassette shell 13. The slit 62 prevents the tongue 56 from being folded, damaged, or irrecoverably deformed in unwanted fashion, by an instantaneous deformation of the cassette shell 13 when the cassette shell 13 falls under gravity to a floor and receives a shock of drop. A width L13 of the slit 62 is 0.4–2.0 mm, preferably 0.5–1.8 mm, and desirably 0.6–1.5 mm. Should the slit 62 have L13 below 0.4 mm, the tongue 56 would have possibility of irrecoverable deformation upon application of external force. Should the slit 62 have L13 over 2.0 mm, appearance of the development signaling device 57 and the cassette shell 13 would be degraded, and unsuitable to be reduced into practice.

In view of suitability to mass production and cost, thermoplastic resin is preferred for material of the cassette shell 13 including the support 58 and the tongue 56. Light-shielding material can be added to the resin. Ratio of carbon black as light-shielding material can be in a range of 0.05–3.00 wt. %. The resin can be provided with addition of lubricant (silicone oil etc.), antistatic, inorganic or organic pigment (titanium oxide etc.), processing aid (zinc stearate etc.), antioxidant, nucleator, and plasticizer, and the like, in amounts as much as required.

Examples of the resin are polystyrene, high-impact polystyrene, styrene-acrylonitrile copolymer, acrylonitrile-butadiene-styrene (ABS) copolymer, polypropylene resin, high-density polyethylene resin, polyethylene terephthalate, polybutylene terephthalate, polycarbonate resin, polyvinyl chloride, and modified resin of any of those examples. In consideration of heightened dimensional precision, heightened physical strength and higher suitability to ultrasonic welding, it is preferred to use high-impact polystyrene inclusive of 0.1–10 wt. % of synthetic rubber which has melt flow rate of 1.0–10.0 grams per 10 minutes, more preferably 2.0–8.0 grams per 10 minutes, and desirably 2.5–7 grams per 10 minutes. In view of avoiding deformation, Vicat softening temperature of the resin is 80° C. or higher under load of 15 kg, preferably 85° C. or higher, and desirably 90° C. or higher. Modulus in elasticity in flexure of the resin is 15,000–30,000 kg/cm$^2$, preferably 18,000–28,000 kg/cm$^2$, and desirably 20,000–28,000 kg/cm$^2$.

Carbon black is added to operate for shielding light. The carbon black is classified according to producing processes as furnace carbon black, channel carbon black and thermal carbon black. Preferred carbon black is furnace carbon black having pH 5–9 and an average grain diameter of 10–80 μm, and particularly furnace carbon black having pH 6–8 and an average grain diameter of 15–50 μm, because of good light-shielding performance and little affect to image reproduction (fogging and/or increase or decrease in the photosensitivity of the photo film.

Representative examples of preferred carbon blacks on the market include Carbon Black #20(B), #30(B), #33(B), #40(B), #41(B), #44(B), #45(B), #50, #55, #100, #600, #2200(B), #2400(B), MA8, MA11 and MA100 (trade names), all produced by Mitsubishi Chemical Industries Ltd. Other examples of carbon blacks are Black Pearls 2, 46, 70, 71, 74, 80, 81 and 607, Regal 300, 330, 400, 660 and 991 and SRF-S, Sterling 10, SO, V, S, FT-FF and MT-FF (trade names), all produced by Cabot Corp.; and Uniteel R, BB, 15, 102, 3001, 3004, 3006, 3007, 3008, 3009, 3011, 3012, XC-3016, XC-3017 and 3020 (trade names), all produced by Ashland Chemical Co. However, the carbon black is by no means limited to these examples.

Furnace carbon black particle of less than 10 μm diameter would be unsuitable for kneading, so that light-shielding ability and physical strength would be low. Above 100 μm, dispersing quality would be higher, but light-shielding ability would be inferior. Increasing density of carbon black to compensate light-shielding ability would result in lowering physical strength and moldability so that the products would be nearly useless in practice. Most carbon blacks beyond the range from pH5 to pH9 would not be applicable because they would be liable to adversely affect photographic properties.

To evade adverse influence on the photographic properties of the photographic film, free sulfur component included in the above-described carbon black should be 0.6% or less, preferably 0.3% or less, and more preferably 0.1% or less. Cyanogen compound included in the carbon black should be 0.01% or less, preferably 0.005% or less, and more preferably 0.001% or less. Aldehyde compound included in the carbon black should be 0.1% or less, preferably 0.05% or less, and more preferably 0.01% or less. It is necessary to consider that even a small amount of these matters have harmful effect on photographic properties.

Loading of the furnace carbon black is preferably 0.05 wt. % to 3.00 wt. %, in the interest of light-tightness, moldability and physical strength of the cassette shell 13. Loading of less than 0.05 wt. % would result in insufficient light-shielding ability. Loading of more than 3.00 wt. % would result in lowering physical strength of the cassette shell 13 and increasing water absorption so much that weld marks, silver streaking and other failure are liable to occur in injection-molding, which would result in deterioration of appearance and surface strength.

As the light screen agent, inorganic pigment such as titanium oxide, red oxide, calcium carbonate, etc. or organic pigment may be used in combination with the above-described carbon black.

To provide the tongue 56, the support 58 and the cassette shell 13 with a lubricant characteristic, lubricant can be mixed with resin molded into those parts, or can be applied to coat the parts. Examples of the lubricants are silicone oil; higher fatty acid amides, including oleic acid amide and erucic acid amide; metal salt of higher fatty acid, including zinc stearate; and ester, including fatty acid higher alcohol ester, and fatty acid polyvalent alcohol ester.

Examples of silicone oil that are usable with resin molded into the cassette shell 13 are dimethyl polysiloxane and carboxyl-modified silicone lubricants disclosed in JP-A 62-284355 and 62-286043. Ratio of the silicone oil to be added can be in a range of 0.05–5.0 wt. %, preferably in a range of 1.0–3.0 wt. %.

Loading of less than 0.05 wt. % would have little smoothing effect. Loading of more than 5.0 wt. % would cause slipping between the resin and screws in an injection molding machine, thereby elongating molding cycles and also increasing the amount of silicone oil bleeding out to the product surface. The bled-out oil would be transferred to the photographic film contained in the cassette shell, and adversely would affect photographic properties of the photographic film, for example, would hinder developing agents from dispersing over the photographic film on photographic processing. In addition, weldability for ultrasonic sealing of the joints between the upper and lower shell halves 11 and 12 would be lowered.

The viscosity of silicone oil is preferably from 1,000 cS to 60,000 cS at 25° C. Viscosity of less than 1,000 cS at 25° C. would result in so large bleedout that has harmful effect on photographic properties. Silicone oil having a viscosity above 60,000 cS would be too difficult to knead into the resin to use in practice. Although there are various kinds of modified silicone oils, such as fluorine-modified silicone oil, on the market, most of them have harmful influence on photographic properties of the photographic film. They are found to be inapplicable to the tongue 56, the support 58 and the cassette 10, for the reasons that they cannot provide sufficient smoothness to the resin, or cause remarkable thermal decomposition during the injection molding. It is preferable to add modifying agents of some kinds as required. Examples of the modifying agents are hereinafter described.

To prevent oxidative destruction of the resin and to prevent creation of breakdown products (alcohol, aldehyde, ketone, carboxylic acid, etc.) harmful to the performance of the photo film, antioxidant can be added preferably to the resin. Examples of antioxidants are as follows:

(a) Phenol-based antioxidants

Vitamin E; vitamin E carboxylate ester; 6-tert-butyl-3-methylphenyl derivatives; 2,6-di-tert-butyl-p-cresol; 2,2'-methylenebis-(4-ethyl-6-tert-butylphenol); 4,4'-butylidenebis(6-tert-butyl-m-cresol); 4,4'-thiobis(6-tert-butyl-m-cresol); 4,4'-dihydroxydiphenylcyclohexane; alkylated bisphenol; styrenated phenol; 2,6-di-tert-butyl-4-methylphenol; n-octadecyl-3-(3',5'-di-tert-butyl-4'-hydroxyphenyl)propionate; 2,2'-methylenebis(4-methyl-6-tertbutylphenol); 4,4'-thiobis(3-methyl-6-tert-butylphenyl); 4,4'-butylidenebis(3-methyl-6-tert-butylphenol); stearyl-β-(3,5-di-tert-butyl-4-hydroxyphenyl)propionate; 1,1,3-tris(2-methyl-4-hydroxy-5-tert-butylphenyl)butane; 1,3,5-trimethyl-2,4,6-tris(3,5-di-tert-butyl-4-hydroxybenzyl)benzene; and tetrakis[methylene-3-(3',5'-di-tert-butyl-4'-hydroxyphenyl)propionate]methane.

(b) Ketone amine condensate-based antioxidants 6-ethoxy-2,2,4-trimethyl-1,2-dihydroquinoline; polymers of 2,2,4-trimethyl-1,2-dihydroquinoline; and trimethyldihydroquinoline derivatives.

(c) Allylamine-based antioxidants

Phenyl-α-naphthylamine; N-phenyl-β-naphthylamine; N-phenyl-N'-isopropyl-p-phenylenediamine; N,N'-diphenyl-p-phenylenediamine; N,N'-di-β-naphthyl-p-phenylenediamine; and N-(3'-hydroxybutylidene)-1-naphthylamine.

(d) Imidazole-based antioxidants 2-mercaptobenzoimidazole; zinc salt of 2-mercaptobenzoimidazole; and 2-mercaptomethylbenzoimidazole.

(e) Phosphite-based antioxidants

Alkylated allylphosphite; diphenylisodecylphosphite; sodium tris(nonylphenyl) phosphite; tris(nonylphenyl)phosphite; and triphenyl phosphite.

(f) Thiourea-based antioxidants

Thiourea derivatives; and 1,3-bis(dimethylamino-propyl)-2-thiourea.

(g) Other antioxidants useful for air oxidation

Dilauryl thiodipropionate.

(h) Hindered phenol-based antioxidants 1,3,5-trimethyl-2,4,6-tris(3,5-di-tert-butyl-4-hydroxybenzyl)benzene;

tetrakis[methylene(3,5-di-tert-butyl-4-hydroxyhydrocinnamate)]methane;

octadecyl-3,5-di-tert-butyl-4-hydroxy-hydrocinnamate;

2,2',2'-tris[(3,5-di-tert-butyl-4-hydroxyphenyl)propionyloxy]ethylisocyanurate;

tetrakis(2,4-di-tert-butyl-phenyl)-4,4'-biphenylene diphosphite; 4,4'-thiobis(6-tert-butyl-o-cresol);

2,2'-thobis(6-tert-butyl-4-methylphenol);

tris(2-methyl-4-hydroxy-5-tert-butylphenyl)butane;

2,2'-methylenebis(4-methyl-6-tert-butylphenol);

4,4'-methylenebis(2,6-di-tert-butylphenol);

4,4'-butylidenebis(3-methyl-6-tert-butylphenol);

2,6-di-tert-butyl-4-methylphenol;

4-hydroxymethyl-2,6-di-tert-butylphenol;

2,6-di-tert-4-n-butylphenol;

2,6-bis(2'-hydroxy-3'-tert-butyl-5'-methylbenzyl)-4-methylphenol;

4,4'-methylenebis(6-tert-butyl-o-cresol); and 4,4'-butylidene-bis(6-tert-butyl-m-cresol).

Among these, particularly preferred antioxidants have a melting point of 100° C. or higher, and more preferably 120° C. or higher, because of small amounts of bleedout and thermal decomposition and little affect to image reproduction of the photo film.

Representative examples of commercially available antioxidants are described below.

(1) Phenol-based antioxidants

SUMILIZER BHT (trade name, manufactured by Sumitomo Chemical), IRGANOX 1076 (trade name, manufactured by Ciba Geigy), MARK AO-50 (trade name, manufactured by Adeca Argus), SUMILIZER BP-76 (trade name, manufactured by Sumitomo Chemical), TOMINOX SS (trade name, manufactured by Yoshitomi), IRGANOX 565 (trade name, manufactured by Ciba Geigy), IONOX WSP (trade name, manufactured by ICI), SANTONOX (trade name, manufactured by Monsanto), SUMILIZER WX R (trade name, manufactured by Sumitomo Chemical), ANTAGECRYSTAL (trade name, manufactured by Kawaguchi), IRGANOX 1035 (trade name, manufactured by Ciba Geigy), ANTAGE W-400 (trade name, manufactured by Kawaguchi), NOCLIZER NS-6 (trade name, manufactured by Ohuchi Shinko), IRGANOX 1425 WL (trade name, manufactured by Ciba Geigy), MARK AO-80 (trade name, manufactured by Adeca Argus), SUMILIZER GA-80 (trade name, manufactured by Sumitomo Chemical), TOPANOL CA (trade name, manufactured by ICI), MARK AO-30 (trade name, manufactured by Adeca Argus), MARK AO-20 (trade name, manufactured by Adeca Argus), IRGANOX 3114 (trade name, manufactured by Ciba Geigy), MARK AO-330 (trade name, manufactured by Adeca Argus), IRGANOX 1330 (trade name, manufactured by Ciba Geigy), CYANOX 1790 (trade name, manufactured by ACC), IRGANOX 1010 (trade name, manufactured by Ciba Geigy), MARK AO-60 (trade name, manufactured by Adeca Argus), SUMILIZER BP-101 (trade name, manufactured by Sumitomo Chemical), and TOMINOX TT (trade name, manufactured by Yoshitomi).

(2) Phosphorus-based antioxidants

IRGAFOS 168 (trade name, manufactured by Ciba Geigy), MARK 2112 (trade name, manufactured by Adeca Argus), WESTON 618 (trade name, manufactured by Vorg-Warner), MARK PEP-8 (trade name, manufactured by Adeca Argus), ULTRANOX 626 (trade name, manufactured by Vorg-Warner), MARK PEP-24G (trade name, manufactured by Adeca Argus), MARK PEP-36 (trade name, manufactured by Adeca Argus), and HGA (trade name, manufactured by Sanko).

(3) Thioether-based antioxidants

DLTDP "YOSHITOMI" (trade name, manufactured by Yoshitomi), SUMILIZER TPL (trade name, manufactured by Sumitomo Chemical), ANTIOX L (trade name, manufactured by Nippon Oil), DMTD "YOSHITOMI" (trade name, manufactured by Yoshitomi), SUMILIZER TPT (trade name, manufactured by Sumitomo Chemical), ANTIOX M (trade name, manufactured by Nippon Oil), DSTP "YOSHITOMI" (trade name, manufactured by Yoshitomi), SUMILIZER TPS (trade name, manufactured by Sumitomo Chemical), ANTIOX S (trade name, manufactured by Nippon Oil), SEENOX 412S (trade name, manufactured by Sipro), MARK AO-412S (trade name, manufactured by Adeca Argus), SUMILIZER TP-D (trade name, manufactured by Sumitomo Chemical), MARK AO-23 (trade name, manufactured by Adeca Argus), SANDSTAB P-EPQ (trade name, manufactured by Sand), IRGAFOS P-BPQ FF (trade name, manufactured by Ciba Geigy), IRGANOX 1222 (trade name, manufactured by Ciba Geigy), MARK 329K (trade name, manufactured by Adeca Argus), WESTON 399 (trade name, manufactured by Vorg-Warner), MARK 260 (trade name, manufactured by Adeca Argus), and MARK 522A (trade name, manufactured by Adeca Argus).

(4) Metal Deactivator

NAUGARD XL-1 (trade name, manufactured by Uniroyal), MARK CDA-1 (trade name, manufactured by Adeca Argus), MARK CDA-6 (trade name, manufactured by Adeca Argus), IRGANOX MD-1024 (trade name, manufactured by Ciba Geigy), and CUNOX (trade name, manufactured by Mitsui Toatsu).

Preferred antioxidants are the phenol-based ones, and particularly the hindered phenol-based ones. Commercially available preferred antioxidants include IRGANOX series products of Ciba Geigy, SUMILIZER BHT, SUMILIZER BH-76, SUMILIZER WX-R and SUMILIZER BP-101 of Sumitomo Chemical Co., Ltd.

It is effective to use one or more, particularly two or more of 2,6-di-tert-butyl-p-cresol (BHT), a low-volatile and high molecular weight hindered phenol-based antioxidant (e.g., IRGANOX 1010, IRGANOX 1076, TOPANOL CA, IONOX 330, all trade names), dilauryl thiodipropionate, distearylthiopropionate and dialkyl phosphate in combination. Since antioxidant is a reducing agent which adversely affects photographic materials, it is necessary to carefully examine its kind and the compounding amount so that its preventing effect against thermal decomposition may be well-balanced in consistency with the photographic properties. In view of this, it is preferable to use phosphorus-based and phenol-based antioxidants, and more preferably hindered phenol-based antioxidants, because these have not much unfavorable influence on the photographic film, such as fogging and disordering of photosensitivity. Among the hindered phenol-based antioxidants, preferred ones have a melting point of 100° C. or higher, and particularly 120° C. or higher. It is most preferable to use two or more of the above-described phenol-based and phosphorus-based antioxidants in combination.

In particular, the antioxidant action is synergistically activated by light-shielding agents such as carbon black. It is preferable to use the above-described phenol-based and phosphorus-based antioxidants in combination with carbon black in view of the high effect of antioxidant action.

In addition, it is possible to select antioxidants disclosed in:

*Plastic Data Handbook*, published by Kogyo Chosakai Publishing Co., Ltd., Tokyo, pp. 794–799;

*Plastic Additives Data*, issued by K. K. Kagaku Kogyo Sha, pp. 327–329; and

*Plastics Age Encyclopedia, Advanced Version* (1986), issued by K. K. Plastic Age, pp. 211–212.

The following description relates to how to evade harmful influence of the above-described antioxidants on photographic films. In general, oxidative destruction of thermoplastic resin is the higher according to the number of ramifications of $CH_3$ in the resin. This is because the more oxygen is absorbed in the resin.

It is assumed that hydrocarbon is automatically oxidized once a free radical is generated by dehydration in the presence of oxygen, according to chain reaction of the following formulas:

1) $RH \rightarrow R\cdot$
2) $R\cdot + O_2 \rightarrow RH \rightarrow ROO\cdot$
3) $ROO\cdot + RH \rightarrow ROOH + R\cdot$
4) $ROOH \rightarrow RO\cdot + \cdot OH$
5) $RO\cdot + RH \rightarrow ROH + R\cdot$
6) $\cdot OH + RH \rightarrow HOH + R\cdot$ Thus, the oxidation of hydrocarbon is accelerated to produce a great quantity of alcohols, aldehydes, acids and the like, and they react with each other to produce polymer.

In order to prevent oxidation of hydrocarbon, it is necessary to intercept the above chain reaction. Antioxidant is used for this purpose. In alternative, it is preferable to load radial scavenger as set forth below.

Examples of the radical scavenger include 1,1-diphenyl-2-picrylhydrazyl, 1,3,5-triphenylferdazyl, 2,2,6,6-tetramethyl-4-piperidone-1-oxyl, N-(3-N-oxyanilino-1,3-dimethylbutylidene)-aniline oxide, a high valency metal salt such as ferric chloride, diphenylpicrylhydrazine, diphenylamine, hydroquinone, tert-butyl catechol, dithiobenzoyldisulfide, p,p'-ditolyltrisulfide, benzoquinone derivative, nitro compound and nitroso compound. Among these, hydroquinone is preferred. The above-described radical scavengers may be used either alone or in combination of several kinds. Compounding amount of radical scavenger may be from 1,000 ppm to 10,000 ppm.

As the antioxidant, there are radical chain terminator and peroxide decomposer. The former reacts with free radical groups, mainly $ROO\cdot$, which are chain carriers, to inactivate them. The latter decomposes hydroperoxide $ROOH$ which is the main source of free radical groups, to stabilize it.

The radical chain terminator includes alkylphenol antioxidant and aromatic amine antioxidant. The peroxide decomposer includes sulfur-containing antioxidant and phosphorus-containing antioxidant.

Antioxidant is reducer adversely affecting photographic film. Should its kind and the compounding amount be unsuitable, degradation of photographic film would occur.

Examples of the antistatic agent preferably loaded in the opaque thermoplastic resin for use in the invention are described below.

I. Nonionic (1) Alkylamine derivatives

T-B103 (trade name, manufactured by Matsumoto Yushi), and T-B104 (trade name, manufactured by Matsumoto Yushi);

Alkylamide types:

Polyoxiyethylene alkylamine: Armostat 310 (trade name, manufactured by Lion Fat & Oil), Tertiary amine (laurylamine): Armostat 400 (trade name, manufactured by Lion Fat & Oil), N,N-bis(2-hydroxyethylcocoamine): Armostat 410 (trade name, manufactured by Lion Fat & Oil), Tertiary amine: ANTISTATIC 273C, 273 and 273E (trade name, manufactured by Fine Org. Chem.), N-hydroxyhexadecyl-di-ethanol-amine: Belg. P. 654,049, and N-hydroxyoctadecyl-di-ethanol-amine: National Dist.

(2) Fatty acid amide derivatives

TB-115 (trade name, manufactured by Matsumoto Yushi), Elegan P100 (trade name, manufactured by Nippon Oils & Fats), and Erik SM-2 (trade name, manufactured by Yoshimura Yukagaku);

Hydroxystearic amide,

Oxalic-N,N'-distearylamidebutylester (manufactured by Hoechst), and

Polyoxyethylenealkylamide.

(3) Ether types

Polyoxyethylenealkylether $RO(CH_2CH_2O)_nH$, and

Polyoxyethylenealkylphenyl ether;

Special nonionic types: Resistat 104, PE100, 116–118, PE 132 and 139 (trade name, manufactured by Daiichi Kogyo Seiyaku), Elegan E115, Chemistat 1005 (trade names, manufactured by Nippon Oils & Fats), Erik BM-1 (trade name, manufactured by Yoshimura Yukagaku), and Electrostripper TS, TS 2, 3, 5, EA, EA2 and 3 (trade name, manufactured by Kao Soap).

(4) Polyhydric alcohol ester types

Glycerine fatty acid ester: mono-, di- or triglyceride of stearic acid or hydroxystearic acid, monoglyceride (manufactured by Nippon Shono), TB-123 (trade name, manufactured by Matsumoto Yushi), and Resistat 113 (trade name, manufactured by Daiichi Kogyo Seiyaku).

Sorbitan fatty acid ester;

Special ester: Erik BS-1 (trade name, manufactured by Yoshimura Yukagaku),

1-Hydroxyethyl-2-dodecylglyoxazoline (manufactured by British Cellophane).

II. Artionic (1) Sulfonic acids

Alkylsulfonate, $RSO_3Na$,

Alkylbenzenesulfonate,

Alkylsulfate, and $ROSO_3Na$.

(2) Phosphoric ester type

Alkyl phosphate.

III. Cationic (1) Amide type cation

Resistat PE300, 401, 402, 406 and 411 (trade name, manufactured by Dai-ichi Kogyo Seiyaku).

(2) Quaternary ammonium salts

Quaternary ammonium chloride,

Quaternary ammonium sulfate, and

Quaternary ammonium nitrate;

Catimin CSM-9 (trade name, manufactured by Yoshimura Yukagaku), CATANAC 609 (trade name, manufactured by American Cyanamide), Denon 314C (trade name, manufactured by Marubishi Yuka), Armostat 300 (trade name, manufactured by Lion Fat & Oil), 100V (trade name, manufactured by ARMOR), Electrostripper ES (trade name, manufactured by Kao Soap), and Chemistat 2009A (trade name, manufactured by Nippon Oils & Fats);

Stearamido propyl-dimethyl-β-hydroxyethyl ammonium nitrate: CATANAC-SN (trade name, manufactured by American Cyanamide).

IV. Ampho-ionic (1) Alkylbetaine type (2) Imidazoline types

Leostat 53 and 532 (trade name, manufactured by Lion Fat & Oil), AMS 53, 303 and 313 (trade name, manufactured by Lion Fat & Oil);

Alkylimidazoline type.

(3) Metal salt types

AMS 576 (trade name, manufactured by Lion Fat & Oil)

Leostat 826 and 923 (trade name, manufactured by Lion Fat & Oil)

$(RNR'CH_2CH_2CH_2NCH_2COO)_2Mg$ (manufactured by Lion Fat & Oil) wherein $R \geq C$, $R'=H$ or $(CH_2)_mCOO-$, $R=C_{3-N}$ hydrocarbon, A=oxygen or an imino group, and M=organic amine or a metal.

(4) Alkyl alanine type

V. Electroconductive Resin

Polyvinylbenzyl type cation, and

Polyacrylic acid type cation.

VI. Others

Resistat 204 and 205 (trade name, manufactured by Daiichi Kogyo Seiyaku), Elegan 2E and 100E (trade name, manufactured by Nippon Oils & Fats), Chemistat 1002, 1003 and 2010 (trade name, manufactured by Nippon Oils & Fats), Erik 51 (trade name, manufactured by Yoshimura Yukagaku), and ALROMINE RV-100 (trade name, manufactured by Geigy).

Among the above-described antistatic agents, the nonionic antistatic agent is particularly preferred due to small harmful influence on photographic properties and human body.

The total addition amount of two or more antistatic agents is preferably from 0.001 wt. % to 5.0 wt. %, and more preferably from 0.005 wt. % to 3.0 wt. %. If the addition amount should be less than 0.001 wt. %, the addition effect of antioxidant action and smoothness is not satisfactory and only cost for kneading increase. On the other hand, if the addition amount should exceed 5.0 wt. %, slipping between the melted resin and the screw of the molding machine is readily caused and the ejection amount of resin becomes unstable. Further, blocking or bleeding out is liable to occur by aging after molding. Thickness of a layer is likely to have deviation.

It is possible in the present invention to add additives as required to the resin. Naturally, the additives to be used are not limited to these examples but can be any known kind and depend upon the properties desired. Examples of the additives are as follows.

1) Plasticizer: phthalate ester, glycol ester, fatty acid ester, and phosphate ester.
2) Stabilizer: lead type, cadmium type, zinc type, alkali earth metal type, and organo-tin type.
3) Flame retardant: phosphate ester, halogenated phosphate ester, halide, inorganic matters, and phosphorus-containing polyol.
4) Filler: alumina, kaolin, clay, calcium carbonate, mica, talc, titanium oxide, and silica.
5) Reinforcer: glass roving, metal fiber, glass fiber, milled glass fiber, and carbon fiber.
6) Foaming agent: inorganic foaming agents (ammonium carbonate and sodium bicarbonate), and organic foaming agents (nitroso type and azo type).
7) Vulcanizer: vulcanizing accelerator, and supplement accelerator.
8) Deterioration inhibitor: ultraviolet light absorber, antioxidant, metal inactivation agent, and peroxide decomposer.
9) Coupling agent: silane type, titanate type, chrome type, and aluminum type.
10) Various thermoplastic resins, thermoplastic elastomer, and rubber.

To conduct an experiment, a sample cassette was produced. The spool 15, the shutter 18, and the shell halves 11 and 12 including the tongue 56 and the support 58 were formed from high-impact polystyrene resin "Denka styrol HI-R-Q" (trade name) manufactured by Denki Kagaku Kogyo K. K. With the resin, carbon black of 1.0 wt. % and silicone oil of 1.5 wt. % as lubricant were kneaded. The carbon black was "Mitsubishi carbon black #950" (trade name) manufactured by Mitsubishi Chemical Industries Ltd. The silicone oil was "Sinetsu silicone KF96H" (trade name) manufactured by Sinetsu Chemical Co., Ltd., and had viscosity of 30,000 cS. The resin parts were formed by the injection molding. The barrel member 26 was formed from the same high-impact polystyrene resin. With the resin, the same carbon black of 0.01 wt. % and titanium oxide of 3.5 wt. % were kneaded. The titanium oxide was "CR60-2" (trade name) manufactured by Ishihara Sangyo Kaisha Ltd. The barrel member 26 was formed by the injection molding.

The flanges 23 and 24 were formed from film 150 μm thick. The film was polymer alloy of polystyrene and polyphenylene ether "ZAIRON X9101" (trade name) manufactured by Asahi Chemical Industry Co., Ltd. The flanges 23 and 24 were formed by the vacuum forming and/or the pressure forming.

To produce the cassette sticker 16, polystyrene film having white pigment was used, and was 50 μm thick. One face of the polystyrene film was provided with a coating for raising suitability to the printing. Adhesive agent was applied to a back face of the polystyrene film, to which a release paper was secured, to prepare raw sticker material having the release paper. As illustrated in FIG. 10, there were formed blanks 16a–16c, which were the first blank 16a for printing a cassette ID number; the second blank 16b for printing information including a manufacturer's name, a product name, a photo film type, photo film sensitivity, a maximum photographable frame number of the photo film, service life, a notice, a country of the product, and a blank portion usable to a user for notes; and the third blank 16c for printing a bar code.

The photo film type and the like were printed. The sticker material was subjected to a halfway cutting process. A bar code and the cassette ID number were printed to produce the cassette sticker 16. The bar code was constituted by encoding information of the manufacturer's name, a manufacturing lot, a manufacturing date, the photo film type, the photo film sensitivity, the maximum photographable frame number of the photo film, and the cassette ID number. The cassette ID number was determined in association with the particular single photo film cassette.

To produce the bar code sticker 25, transparent polystyrene film was used, and was 50 μm thick. One face of the polystyrene film was provided with a deposit layer of aluminum at the thickness of approximately 400 angstroms. Adhesive agent was applied to the aluminum layer of the polystyrene film, to which release paper was secured, to prepare raw sticker material having the release paper. A bar code was printed on a back face opposite to the aluminum layer. A peripheral portion was cut halfway. The center was punched, to produce the bar code sticker 25.

The tongue 56 had the thickness T5=0.5 mm and a width L15=2.0 mm. The support 58 supporting the tongue 56 had the thickness T4=0.25 mm and a width L16=1.6 mm. The recess 61a of the tongue 56 had the depth T2=0.15 mm. The thinned connector portion 61 under the groove 61a had the thickness T3=0.35 mm. The width L4 of the slit 62 was 0.2

Operation of the groove 61a and the partition 59 was observed regarding plural samples of the cassette 10. Results of the testing of the groove 61a and the partition 59 are shown in TABLE 1.

TABLE 1

Figure 11A:
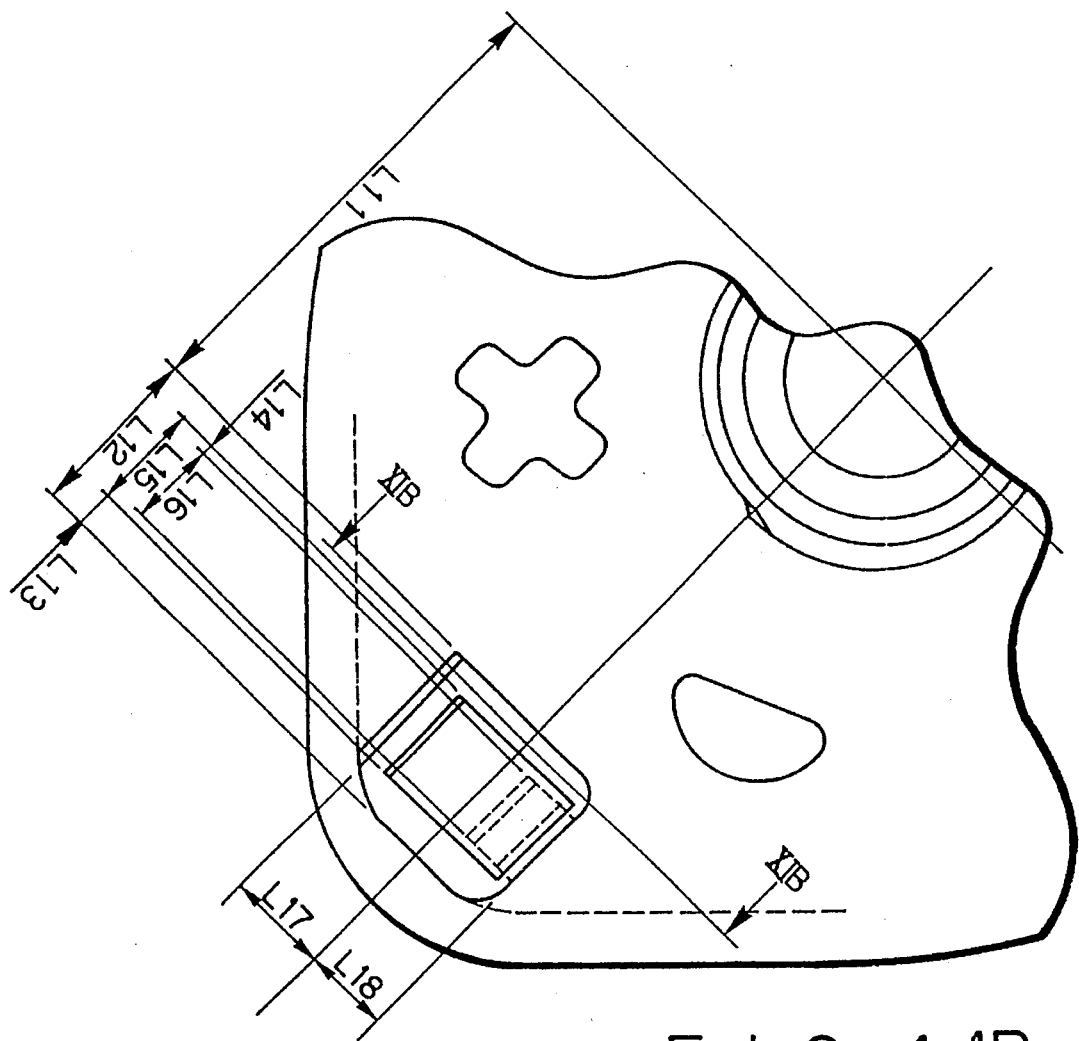
FIG. 11A is an explanatory view in elevation, partially cutaway, illustrating a cassette of Type A, which has the tongue and lacks a partition.
Figure 11B:
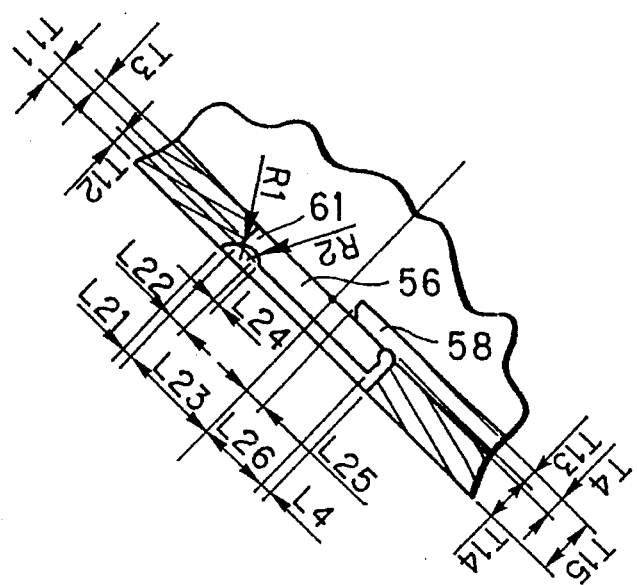
FIG. 11B is an explanatory view in section, illustrating the tongue of FIG. 11A.
Figure 12A:
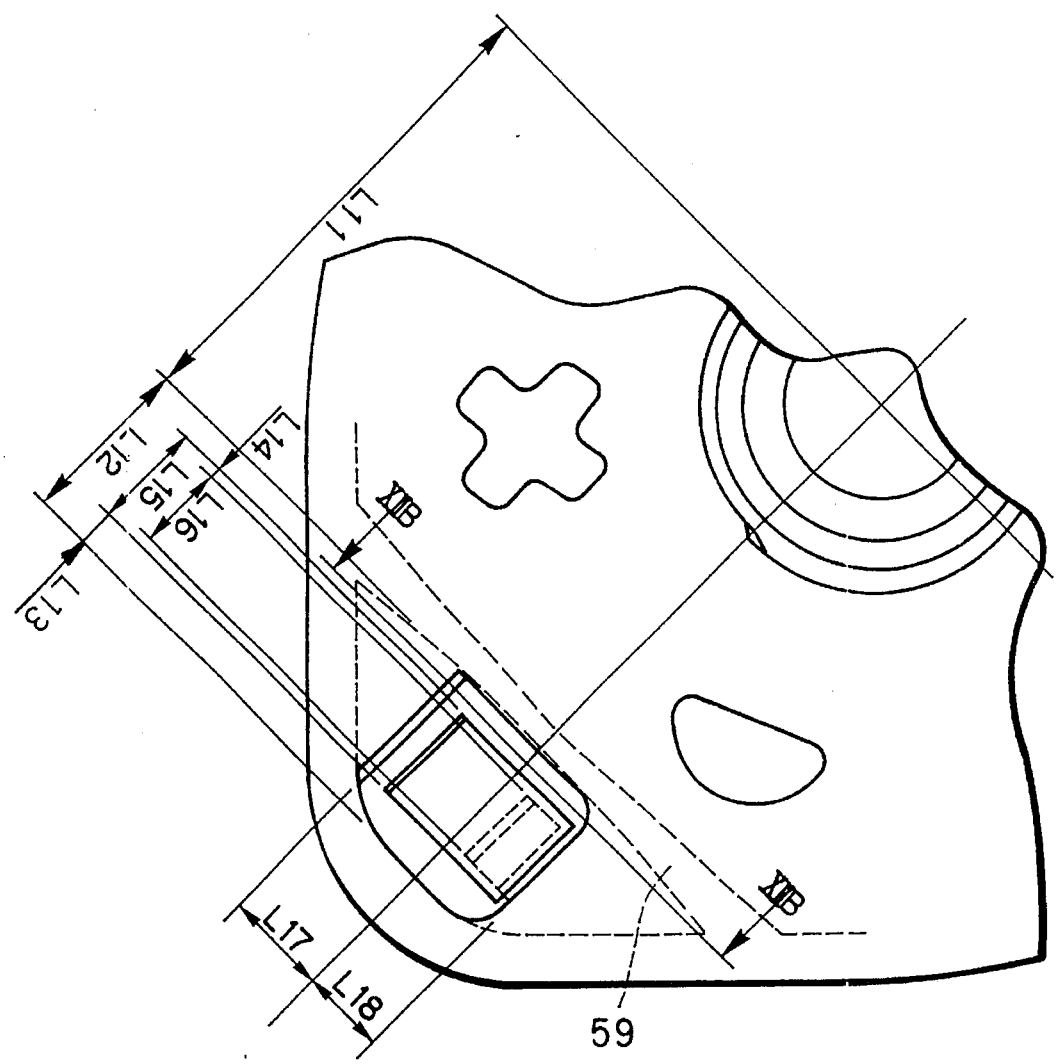
FIGS. 12A and 12B are explanatory views, illustrating a cassette of Type B, of which a tongue has a flat retracted face.
Figure 12B:
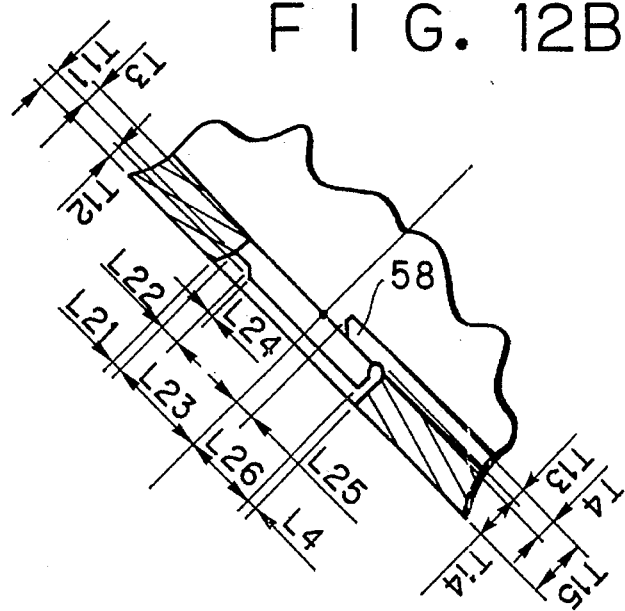
Figure 13A:
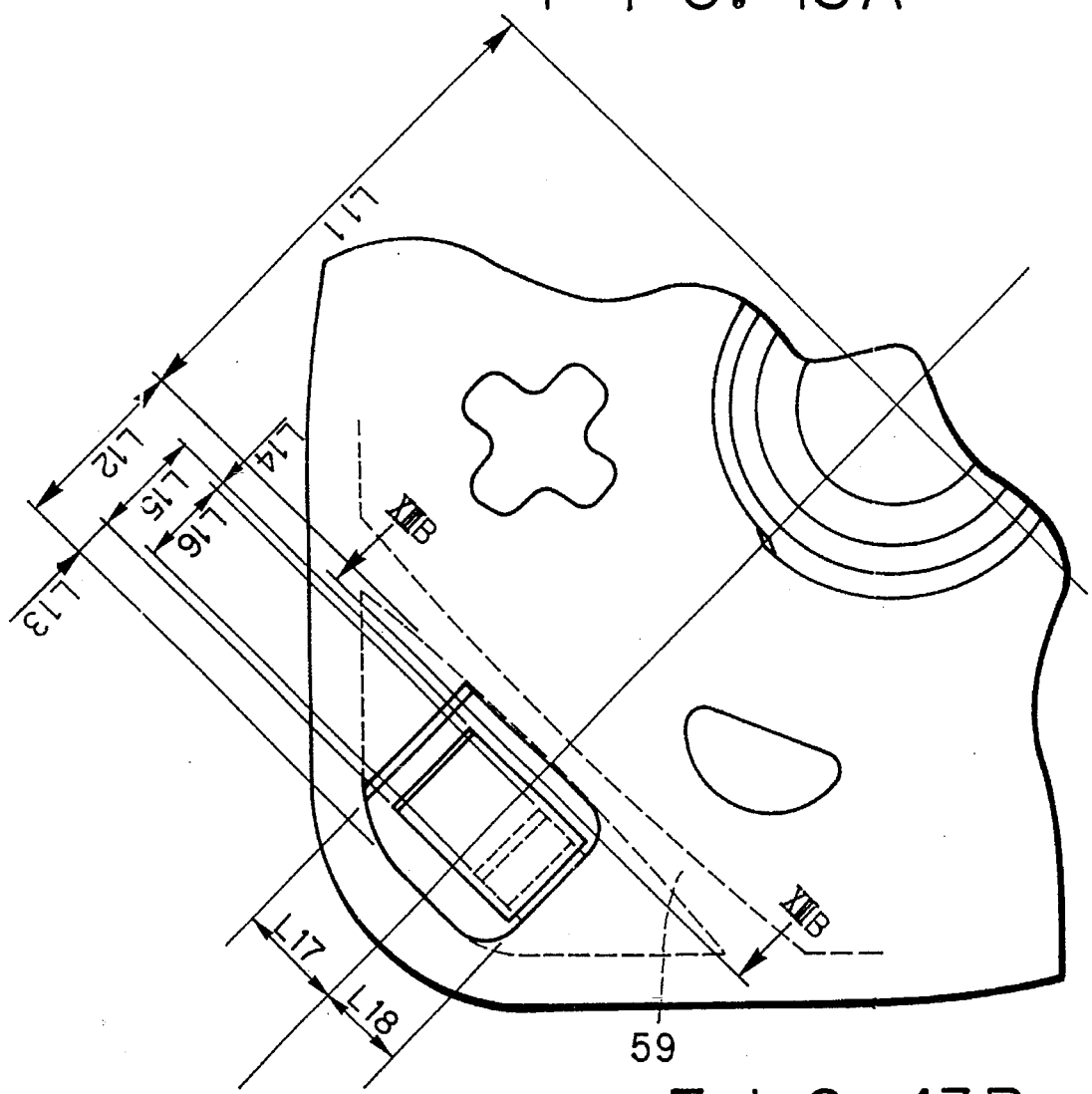
FIGS. 13A and 13B are explanatory views, illustrating the cassette of Type C the same as FIGS. 1–10.
Figure 13B:
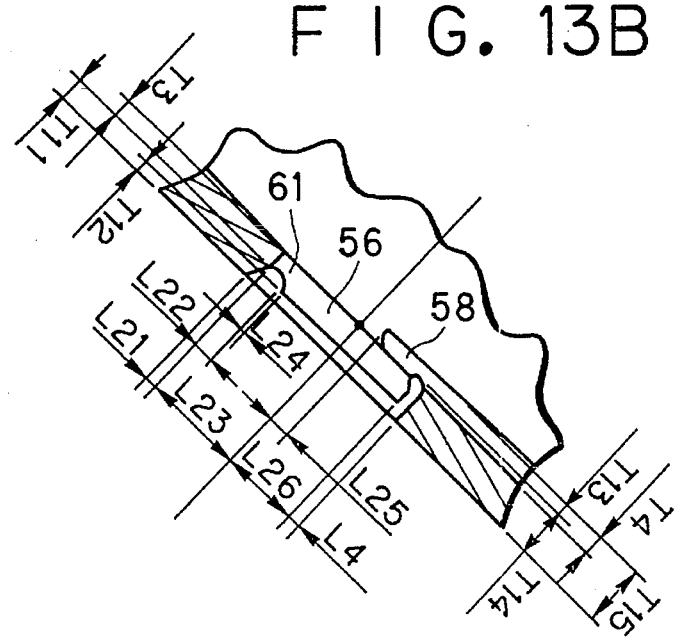
Figure 15A:
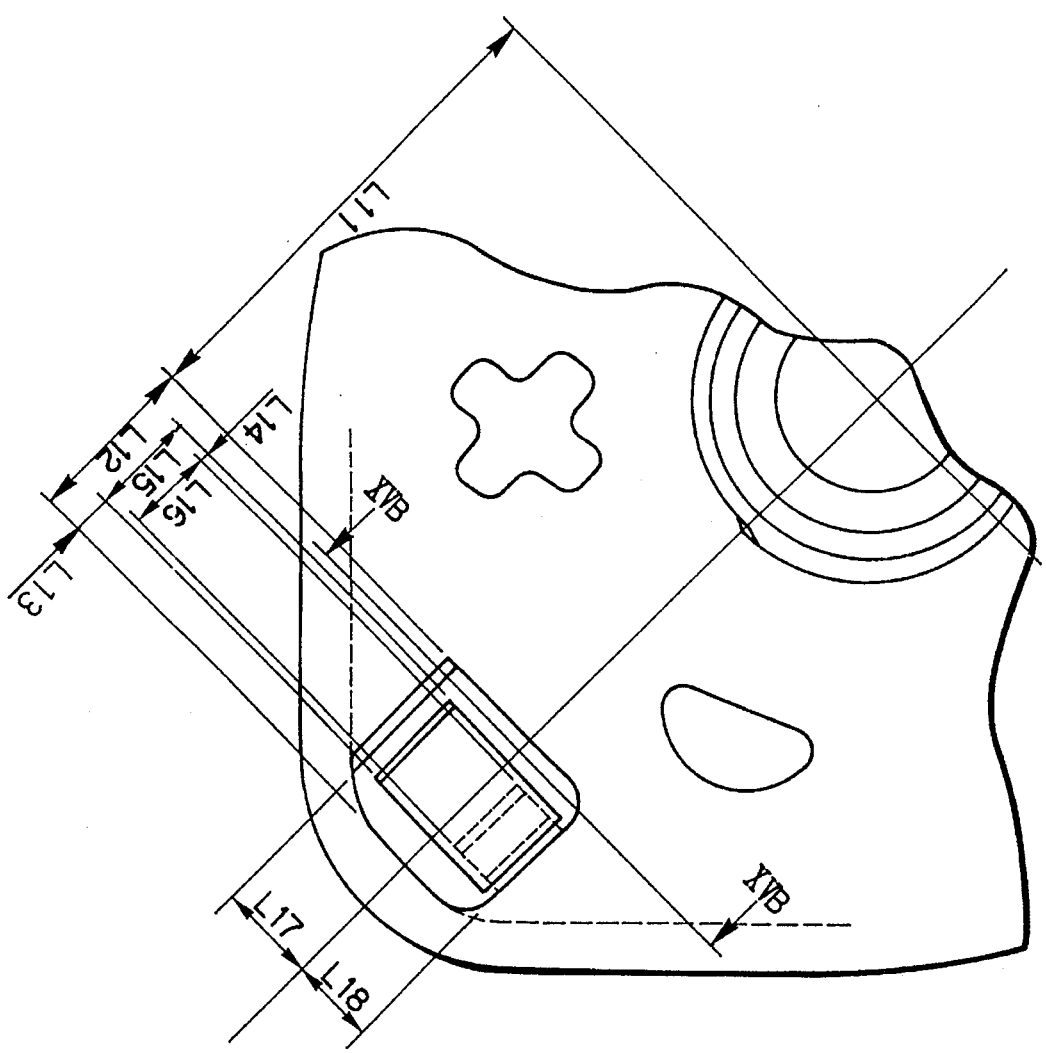
FIGS. 15A and 15B are explanatory views, illustrating a comparable cassette of Type A'.
Figure 15B:
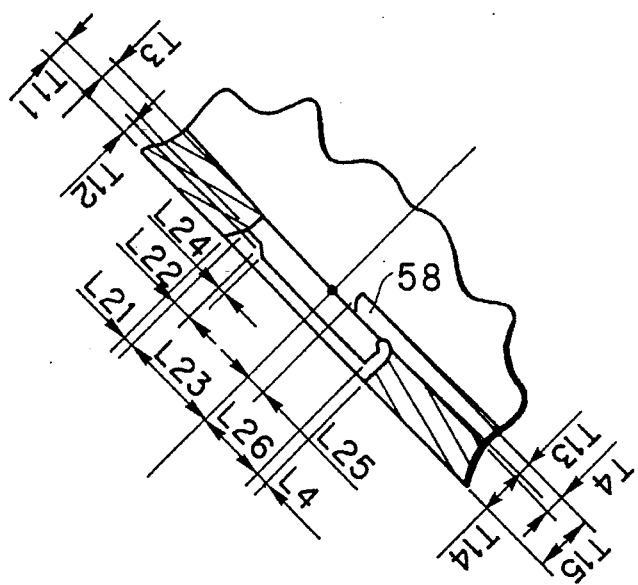

| Types | Bending test | Influence to photo film |
|---|---|---|
| A | Folded but not separated | None |
| A' | Folded and separated | Damage occurred |
| B | Folded and separated | None |
| C | Folded but not separated | None | where Type A is illustrated in FIGS. 11A and 11B, and had the groove 61a and did not have the partition 59;

Type B is illustrated in FIGS. 12A and 12B, and did not have the groove 61a but had the partition 59;

Type C is illustrated in FIGS. 13A and 13B, and had both the groove 61a and the partition 59;

Type A' is illustrated in FIGS. 15A and 15B, and did not have the groove 61a nor the partition 59.

In FIGS. 11A–13B, 15A and 15B, dimensions were determined as follows: L4=0.2 mm, L11=8.9 mm, L12=3.2 mm, L13=0.5 mm, L14=0.2 mm, L15=2 mm, L16=1.6 mm, L17=1.9 mm, L18=1.6 mm, L21=0.2 mm, L22=0.4 mm, L23=1.9 mm, L24=0.1 mm, L25=0.4 mm, L26=1.4 mm, T3=0.35 mm, T4=0.35 mm, T11=0.4 mm, T12=0.25 mm, T13=0.25 mm, T14=0.85 mm, T15=1.1 mm. In FIGS. 11B and 13B, curvatures were determined: R1=0.3 mm, R2=0.2 mm.

Operation of the tongue 56 relative to the slit 62 was observed by conducting an experiment of drop of the cassette 10. Conditions and results of the experiment are shown in TABLE 2.

TABLE 2

Distance of drop: 2 m, by free fall;
Portion of collision: corner the closest to the tongue 56;
Floor of collision: iron plate, 15 mm thick;
Number of samples: 100 samples;
Number of times of drop of each sample: 10 times;
Number of samples of failure: zero.

Operation of the above constructed photo film cassette is described now. A user purchases the cassette 10, with which a camera is loaded. Before the loading, the indicator plate 36 of the cassette 10 is observable in the first indicator opening 49, which indicates the unexposed status of the photo film 14. The surface of the indicator plate 36 is colored in "white" color which is different from the color of the cassette shell 13. The unexposed status of the photo film 14 is recognized as the "white" color is seen through the first indicator opening 49.

In advance of the user's loading the camera with the cassette 10, the cassette 10 may be accidentally dropped on a floor or the like. The cassette shell 13 may be instantaneously deformed or distorted. However the slit 62 operates to prevent direct application of force to the tongue 56 from the periphery of the slit 62. It is possible to protect the tongue 56 from being folded or bent.

If the user erroneously grasps the development signaling device 57 in holding the cassette 10, the tongue 56 is not folded down easily, as it is supported by the support 58 toward the outside.

The user loads the chamber of the camera with the cassette 10. An end of the spool 15 is engaged with a spool drive mechanism of the camera. The spool 15 is rotated in the unwinding direction, to advance the photo film 14 through the passage port 17 to the outside. The indicator plate 36 is indicated at the second indicator opening 50, to indicate the partially exposed status of the photo film 14.

A shutter device of the camera known in the photographic field is operated to take exposures one after another. All the frames of the photo film 14 are photographed. Then the photo film 14 is wound into the cassette shell 13. Finally the leader of the photo film is included in the cassette shell 13. The cassette 10 is unloaded from the camera. The indicator plate 36 of the cassette 10 from the camera is displaced to the third indicator opening 51, which indicates the exposed status of the photo film 14.

A photofinishing operator of a photo laboratory checks the third indicator opening 51 of the cassette 10 visually, to confirm the exposed undeveloped status indicated by the appearance of the white color of the indicator plate 36 at the third indicator opening 51. Then the photo film 14 is developed. After the developing steps, the indicator plate 36 is shifted to the fourth indicator opening 52 for the developed status.

Figure 8B:
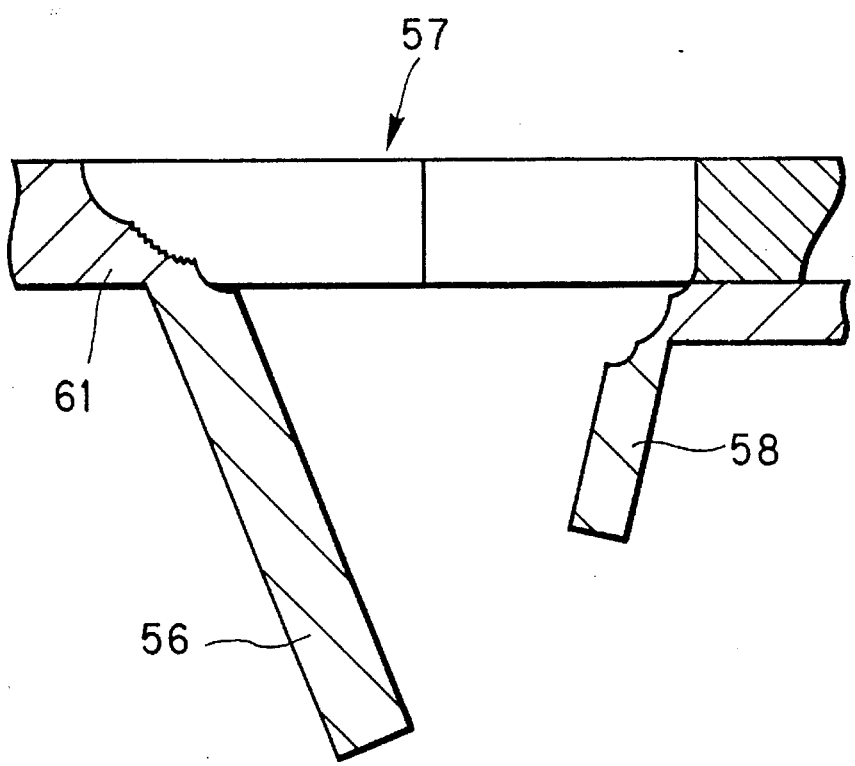
FIG. 8B is a cross section illustrating the tongue after the development.

The photofinishing operator manually depresses the tongue 56 of the development signaling device 57 forcibly. As illustrated in FIG. 8B, the tongue 56 as well as the support 58 is folded toward the inside of the cassette shell 13. The tongue 56 and the support 58 respectively have the grooves 61a and 64. The tongue 56 and the support 58 are neatly folded by following the orientation of the grooves 61a and 64. No rough folding or separation occurs. Also, the grooves 61a and 64 facilitate the gradual folding. The tongue 56 remains connected at least partially. This prevents the tongue 56 and the support 58 from becoming waste separated from the cassette shell 13.

If the tongue 56 should be separated and cut away from the cassette shell 13, the partition 59 lies between the chamber for the photo film 14 with the spool 15 and the chamber for the development signaling device 57, and hinders the tongue 56 from entering the former chamber. It is possible to keep the spool 15 rotatable and keep the photo film 14 undamaged, as the tongue 56 does not contacted on the photo film 14 or the spool 15.

The tongue 56 is folded down irrecoverably, to signal information of the developed status of the cassette 10. The cassette can be discerned from an unused photo film cassette. Various errors are reliably avoided: an unexposed photo film is prevented from being unwound out of a cassette; and the photo film after the exposure and the development is prevented from being loaded in a camera.

Figure 14:
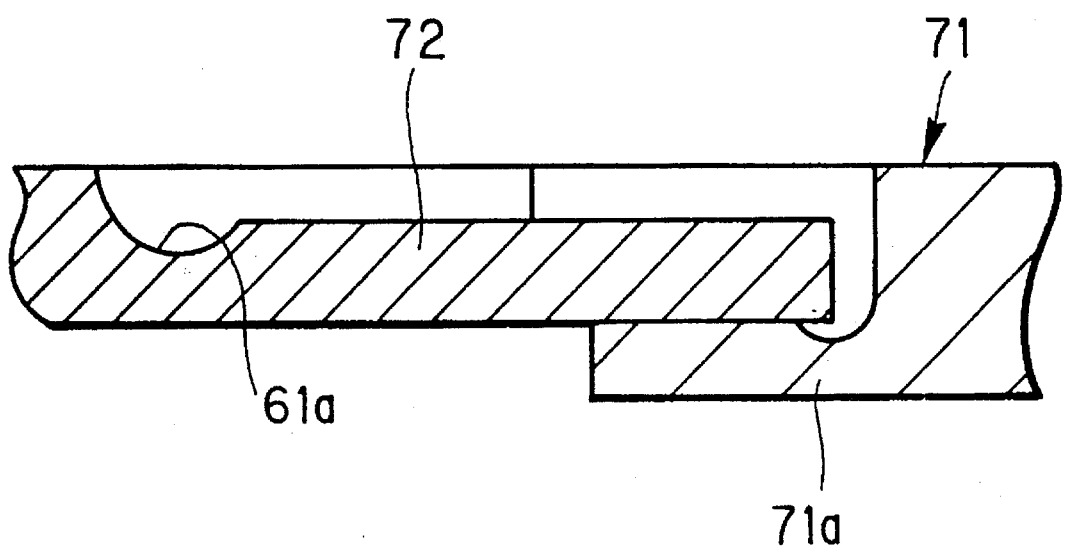
FIG. 14 is a cross section illustrating the tongue of another preferred cassette, having a variant support.

In the above embodiment, the support 58 is previously formed separately, and secured to the cassette shell 13. Alternatively, a support 71a can be formed integrally with a cassette shell 71, as illustrated in FIG. 14, to support a tongue 72.

In the above embodiments, the groove 61a is formed along a fold-designated line of the tongue 56, 72. However it is alternatively possible to form a different shape of at least one recess along at least part of a fold-designated line of a tongue, for the purpose of rendering the tongue flexible along the fold-designated line. Such a recess may comprise a pair of cutouts arranged in the width direction of the tongue, a single slot in combination with a pair of thinned hinges, or the like.

In the above embodiments, the support 58, 71a lies across the slit 62. Alternatively, a support may be disposed behind the groove 61a to prevent the tongue 56, 72 from being bent inwardly.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film cassette of which a spool with photo film wound thereon is contained in a cassette shell in rotatable fashion, and in which rotation of said spool causes said photo film to advance to an outside of said cassette shell, said photo film cassette comprising:

a tongue portion, formed by cutting a slit having a shape of a cornered line and in a wall of said cassette shell, said tongue portion, when folded, signaling a developed status of said photo film;

a first groove, formed in said tongue portion, and across a proximal end of said tongue portion, for rendering said tongue portion bendable; and a support portion, disposed on an inside of a wall of said cassette shell, contacted on an inside of said tongue portion, for preventing said tongue portion from being bent toward an inside of said cassette shell while said tongue portion is pressed with force below a predetermined range.

2. A photo film cassette as defined in claim 1, wherein a periphery of said tongue portion is defined by said first groove and said slit, and said support portion is disposed across said slit.

3. A photo film cassette as defined in claim 2, wherein an inner surface of said first groove is curved or flat.

4. A photo film cassette as defined in claim 1, further comprising a partition portion, disposed in said cassette shell, for dividing an inside of said cassette shell into a status indicating chamber and a signaling chamber, said spool being contained in said status indicating chamber with said photo film, said tongue portion being associated with said signaling chamber, said partition portion preventing said tongue portion from entering said status indicating chamber when said tongue portion is separated from said cassette shell.

5. A photo film cassette as defined in claim 3, wherein a width of said slit is 0.4–2.0 mm.

6. A photo film cassette as defined in claim 5, wherein a thickness of said tongue portion is 0.2–0.5 mm, and a depth of said first groove is 0.1–0.4 mm.

7. A photo film cassette as defined in claim 2, wherein said cassette shell includes first and second shell halves respectively formed from resin, said tongue portion is formed with said first shell half, and said support portion is formed with said first shell half.

8. A photo film cassette as defined in claim 7, wherein photo film has an emulsion surface and a back surface opposite to said emulsion surface, said first and second shell halves define a passage port through which said photo film is passed, said first shell half contacts said emulsion surface of said photo film passed through said passage port, and said second shell half contacts said back surface of said photo film passed through said passage port.

9. A photo film cassette as defined in claim 8, wherein said first groove is formed in an outer wall of said tongue portion.

10. A photo film cassette as defined in claim 9, further comprising a second groove, formed in said support portion, extended across said support portion in a position associated with said slit, for being folded when said support portion is pressed with force of at least said predetermined range.

11. A photo film cassette as defined in claim 10, wherein said tongue portion is disposed one of two end faces of said cassette shell.

12. A photo film cassette as defined in claim 11, further comprising a partition portion, disposed in said cassette shell, for dividing an inside of said cassette shell into a status indicating chamber and a signaling chamber, said spool being controlled for a stop position in said status indicating chamber to signal the used status of said photo film, said tongue portion being associated with said signaling chamber, said partition portion preventing said tongue portion from entering said status indicating chamber when said tongue portion is separated from said cassette shell.

13. A photo film cassette as defined in claim 12, wherein said support portion is formed integrally with said cassette shell, to support said tongue portion.

14. A photo film cassette as defined in claim 12, wherein said support portion is secured to said cassette shell.

15. A photo film cassette as defined in claim 14, further comprising an indicator member, disposed in said cassette shell on an inside of said end face of disposition of said tongue portion, and moved to plural positions by external operation, said indicator member being colored differently from said cassette shell, and adapted to indicating information associated with each of said plural positions in said end face of said cassette shell.

16. A photo film cassette as defined in claim 7, wherein said resin is selected among polystyrene, high-impact polystyrene, styrene-acrylonitrile copolymer, acrylonitrile-butadiene-styrene copolymer, polypropylene, high-density polyethylene, polyethylene terephthalate, polybutylene terephthalate, polycarbonate, polyvinyl chloride, and modified resin of any thereof.

17. A photo film cassette of which a spool with photo film wound thereon is contained in a cassette shell in rotatable fashion, and in which rotation of said spool causes said photo film to advance to an outside of said cassette shell, said photo film cassette comprising:

a tongue portion, formed by cutting a slit having a shape of a cornered line in a wall of said cassette shell, said tongue portion, when folded, signaling a developed status of said photo film; and a partition portion, disposed in said cassette shell, for dividing an inside of said cassette shell into a status indicating chamber and a signaling chamber, said spool being controlled for a stop position in said status indicating chamber to signal the used status of said photo film, said tongue portion being associated with said signaling chamber, said partition portion preventing said tongue portion from entering said status indicating chamber when said tongue portion is separated from said cassette shell.

18. A photo film cassette as defined in claim 17, further comprising a first groove, formed in said tongue portion, and across a proximal end of said tongue portion, for rendering said tongue portion bendable.

19. A photo film cassette as defined in claim 18, wherein an inner surface of said first groove is curved or flat.

20. A photo film cassette of which a spool with photo film wound thereon is contained in a cassette shell in rotatable fashion, and in which rotation of said spool causes said photo film to advance to an outside of said cassette shell, said photo film cassette comprising:

a tongue portion, formed by cutting a slit having a shape of a cornered line and in a wall of said cassette shell, said tongue portion, when folded, signaling a developed status of said photo film;

a fold-designated line, extended across a proximal end of said tongue portion, there being at least one recess formed along at least part of said fold-designated line, said recess rendering said tongue portion bendable along said fold-designated line; and a support portion, disposed on an inside of a wall of said cassette shell, contacted on an inside of said tongue portion, for preventing said tongue portion from being bent toward an inside of said cassette shell while said tongue portion is pressed with force below a predetermined range.

* * * * *